United States Patent
Buckland

(10) Patent No.: US 11,080,418 B1
(45) Date of Patent: Aug. 3, 2021

(54) SYSTEM AND METHODS FOR THE MANAGEMENT AND SECURITY OF DATA VARIATIONS IN AN ELECTRONIC SPREADSHEET

(71) Applicant: Lee David Buckland, Round Rock, TX (US)

(72) Inventor: Lee David Buckland, Round Rock, TX (US)

( * ) Notice: Subject to any disclaimer, the term of this patent is extended or adjusted under 35 U.S.C. 154(b) by 0 days.

(21) Appl. No.: 17/112,736

(22) Filed: Dec. 4, 2020

Related U.S. Application Data

(63) Continuation of application No. 17/013,317, filed on Sep. 4, 2020, now Pat. No. 10,915,653.

(60) Provisional application No. 62/940,768, filed on Nov. 26, 2019.

(51) Int. Cl.
  *G06F 21/00* (2013.01)
  *G06F 21/62* (2013.01)
  *G06F 21/60* (2013.01)
  *G06F 40/18* (2020.01)

(52) U.S. Cl.
  CPC ........ *G06F 21/6218* (2013.01); *G06F 21/602* (2013.01); *G06F 40/18* (2020.01)

(58) Field of Classification Search
  CPC ..... G06F 21/6218; G06F 40/18; G06F 21/602
  See application file for complete search history.

(56) References Cited

U.S. PATENT DOCUMENTS

| | | | |
|---|---|---|---|
| 7,523,135 B2 ‡ | 4/2009 | Bradford | G06Q 10/06 |
| 9,589,067 B2 ‡ | 3/2017 | Kamata | G06F 40/14 |
| 10,915,653 B1 * | 2/2021 | Buckland | G06F 21/6218 |
| 2006/0161509 A1 * | 7/2006 | Zhuang | G06F 16/2308 |
| 2007/0061344 A1 * | 3/2007 | Dickerman | G06F 40/18 |
| 2010/0312803 A1 ‡ | 12/2010 | Gong | G06T 11/206 707/805 |
| 2012/0030557 A1 ‡ | 2/2012 | Wiblin | G06F 40/174 715/226 |
| 2013/0217163 A1 * | 8/2013 | Yoneda | H01L 33/0095 438/33 |
| 2016/0274770 A1 * | 9/2016 | Lovati | G06Q 10/06 |
| 2016/0275151 A1 * | 9/2016 | Lovati | G06Q 10/06 |

\* cited by examiner
‡ imported from a related application

*Primary Examiner* — Shin-Hon (Eric) Chen
(74) *Attorney, Agent, or Firm* — Plager Schack LLP; Mark H. Plager; Stephen Hallberg

(57) ABSTRACT

System and methods are disclosed for the management and security of data variations in an electronic spreadsheet. Keeping all relevant information in a single document, with granular controls to protect and secure access based on each individual or their role within an organization, eliminates the need for workarounds, and simplifies the management of the contained data. Tracking data as it is being entered, also allows the system to notify the user when protected information is detected, and appropriate action to be taken to ensure compliance with any requirements.

5 Claims, 16 Drawing Sheets

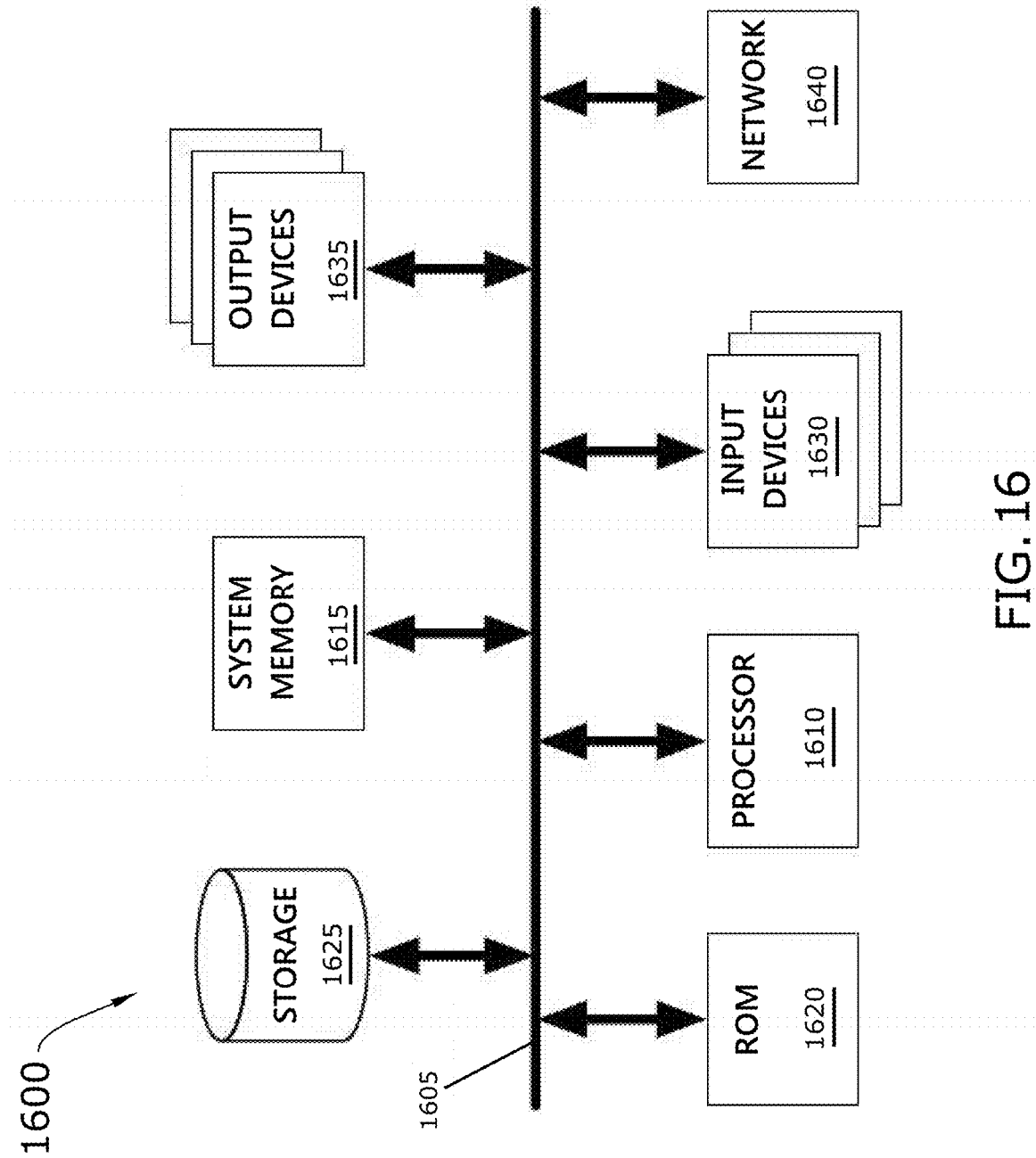

SYSTEM AND METHODS FOR THE MANAGEMENT AND SECURITY OF DATA VARIATIONS IN AN ELECTRONIC SPREADSHEET

CLAIM OF BENEFIT TO PRIOR APPLICATION

This application is a continuation of and claims benefit to U.S. Non-Provisional patent application Ser. No. 17/013,317, entitled "SYSTEM AND METHODS FOR THE MANAGEMENT AND SECURITY OF DATA VARIATIONS IN AN ELECTRONIC SPREADSHEET," filed Sep. 4, 2020. The U.S. Non-Provisional patent application Ser. No. 17/013,317 is incorporated herein by reference.

BACKGROUND

Embodiments of the invention described in this specification relate generally to data variation and protection systems, and more particularly, to an electronic spreadsheet data variation management and security system and methods for the management and security of data variations in an electronic spreadsheet.

Existing data modeling capabilities provide limited flexibility, often leading to inaccurate or inconsistent results, duplication of effort, inappropriate distribution of privileged information, and lack of compliance with data handling regulations.

Native capabilities within existing spreadsheet application solutions, regarding the ability to define variations of data held in a given location, often limits the scope of what can be defined as a variation, and typically offers little or no additional protection capabilities for its contents. Such solutions also require the user to have knowledge of protected data classifications and ensure they have the prerequisite skill to be able to appropriately handle such information in accordance with the established requirements.

For instance, users of spreadsheet applications often create multiple files, or worksheets, in order to represent variations of data, which can become cumbersome to manage efficiently if the data needs to be shared; especially, if the file contains sensitive information. This is a problem because maintaining different variations of data, while ensuring a consistent analysis model or graphical representation of the data for each variation, requires the user to make the same changes in multiple locations. Also, protecting sensitive areas of information in a controlled fashion is limited or non-existent with conventional data modeling capabilities.

Therefore, what is needed is a way to facilitate different variations of data while keeping all relevant information in a single document, with granular controls to protect and secure access, based on each individual or their role within an organization, thereby eliminating the need for workarounds, and simplifying the management of the contained data, and tracking data as it is being entered, also allows the system to notify the user when protected information is detected, and appropriate action to be taken to ensure compliance with any requirements.

BRIEF DESCRIPTION

A novel electronic spreadsheet data variation management and security system and novel methods for the management and security of data variations in an electronic spreadsheet are disclosed. In some embodiments, the electronic spreadsheet data variation management and security system includes a preferred interface with interface tools for creating and tracking various versions, scenarios, or "layers" of a data model, for a given cell or a plurality of cells. The given cell or plurality of cells constitute a capture area (also referred to as a range). Each layer may include user provided data and/or system generated data. The user provided data may be secured using an encryption algorithm and a user access control mechanism (also referred to as "user access controls"). The system generated data relates to user data, such as when information needs to be redacted, obfuscated, or calculated based on the data held within other layers within the same range, or hidden from particular users per user access permissions defined by the user access controls.

In some embodiments, the interface tools of the electronic spreadsheet data variation management and security system include graphical interface tools associated with underlying processing modules that implement one or more of the methods for the management and security of data variations in an electronic spreadsheet. In some embodiments, the methods for the management and security of data variations in an electronic spreadsheet include (i) a high level operation selection and execution method for the management and security of data variations in an electronic spreadsheet, (ii) a method for enabling a layering capability for a given range of an electronic spreadsheet, (iii) a method for copying layer contents to a defined range that the layer applies to in an electronic spreadsheet, (iv) a method for updating cell range contents in a layer and applying updates to dependent layers, (v) a method for calculating layer contents for layers containing information generated by the system, (vi) a method for adding a layer and layer contents for a given layer enabled range, (vii) a method for removing a layer, (viii) a method for applying encryption to one or more layers, (ix) a method for removing encryption, (x) a method for embedding data in a workbook when saving a spreadsheet file with user work, (xi) a method for encrypting a layer, (xii) a method for selecting a combination of layers managed as a group, (xiii) a method for substituting a supplied cell value with a system generated alternative value, and (xiv) a method for translating a supplied cell value with a masked equivalent.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 16 conceptually illustrates an electronic system with which some embodiments of the invention are implemented.

DETAILED DESCRIPTION

Figure 1:
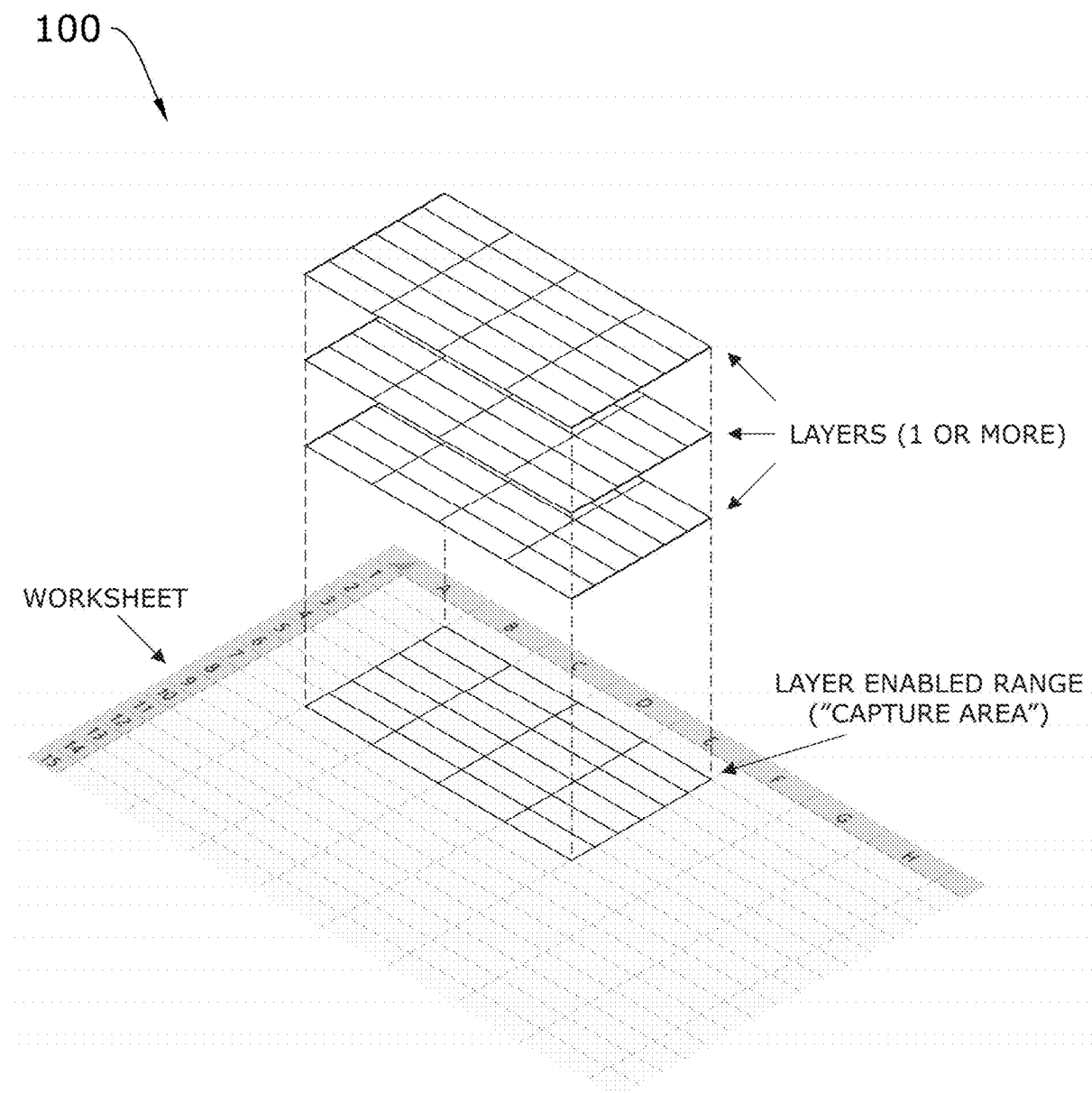
FIG. 1 conceptually illustrates the layering capability of the electronic spreadsheet data variation management and security system, with the layering demonstrated for a given range and where each layer may include a variation of data for a given range.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel electronic spreadsheet data variation management and security system and novel methods for the management and security of data variations in an electronic spreadsheet. In some embodiments, the electronic spreadsheet data variation management and security system includes a preferred interface with interface tools for creating and tracking various versions, scenarios, or "layers" of a data model, for a given cell or a plurality of cells. The given cell or plurality of cells constitute a capture area (also referred to as a range). Each layer may include user provided data and/or system generated data. The user provided data may be secured using an encryption algorithm and a user access control mechanism (also referred to as "user access controls"). The system generated data relates to user data, such as when information needs to be redacted, obfuscated, or calculated based on the data held within other layers within the same range, or hidden from particular users per user access permissions defined by the user access controls.

As stated above, existing data modeling capabilities provide limited flexibility, often leading to inaccurate or inconsistent results, duplication of effort, inappropriate distribution of privileged information, and lack of compliance with data handling regulations. In regards to the ability to define variations of data held in a given location, for example, the native capabilities within existing spreadsheet application solutions are typically limited in the scope of what can be defined as a variation, and generally offer little or no additional protection capabilities for the data contents. Such solutions also require the user to have knowledge of protected data classifications and ensure they have the prerequisite skill to be able to appropriately handle such information in accordance with the established requirements. For instance, users of spreadsheet applications often create multiple files, or worksheets, in order to represent variations of data, which can become cumbersome to manage efficiently if the data needs to be shared; especially, if the file contains sensitive information. This is a problem because maintaining different variations of data, while ensuring a consistent analysis model or graphical representation of the data for each variation, requires the user to make the same changes in multiple locations. Also, protecting sensitive areas of information in a controlled fashion is limited or non-existent with conventional data modeling capabilities. Embodiments of the electronic spreadsheet data variation management and security system and methods for the management and security of data variations in an electronic spreadsheet described in this specification solve such problems by providing a layering capability and allowing variations of data to be held within a single cell, or within a plurality of cells (or "range" of cells), which are then able to be defined and secured. These variations, or layers, can contain either user defined information, an abstraction of data based on other layers defined for the same location (to enhance the modeling capabilities), or system generated variants (to prevent the original information being revealed where it is not appropriate to do so). Each of these layers, can be secured in one or more ways, such as preventing changes to or encrypting the data, ensuring no unauthorized access to the information and its integrity. Having data co-exist in a single location, allows complex models and data visualization techniques to be created and utilized rapidly, and applied in a consistent fashion across multiple variations of data, improving accuracy and consistency, while enhancing productivity. Furthermore, monitoring user data entry and matching against a series of rules for known protected data classifications, allows appropriate actions to be taken to ensure the handling of such information in accordance with legal, regulatory, and business requirements.

In some embodiments, the interface tools of the electronic spreadsheet data variation management and security system include graphical interface tools associated with underlying processing modules that implement one or more of the methods for the management and security of data variations in an electronic spreadsheet. The methods for the management and security of data variations in an electronic spreadsheet include individual or combinations of sequences of steps to carry out one or more functions of the electronic spreadsheet data variation management and security system.

In some embodiments, the high level operation selection and execution method for the management and security of data variations in an electronic spreadsheet applies to each of several operations available to a user of the electronic spreadsheet data variation management and security system. In some embodiments, the high level operation selection and execution method for the management and security of data variations in an electronic spreadsheet starts with selection of an operation. Upon selection of a particular operation, the high level operation selection and execution method (i) determines whether to permit the user to select the particular operation. When the user is not permitted to select the particular operation, the high level operation selection and execution method (ii) prevents selection of the operation and then ends. On the other hand, when the user is permitted to select the particular operation, the high level operation selection and execution method (iii) determines whether prerequisites have been met. When prerequisites have not been met, the high level operation selection and execution method (ii) prevents selection of the operation and then ends. However, when the prerequisites have been met, the high level operation selection and execution method (iv) enables selection of the particular operation for the user, (v) waits for the particular operation to be selected, and then (vi) determines whether the particular selected operation is valid. When the particular selected operation is not valid, the high level operation selection and execution method (vii) cancels the particular operation and then ends. Yet when the particular selected operation is valid, then the high level operation selection and execution method (viii) performs the particular operation, after which the high level operation selection and execution method ends. The high level operation selection and execution method for the management and security of data variations in an electronic spreadsheet is described in further detail below, by reference to FIG. 2.

In some embodiments, the method for enabling a layering capability for a given range of an electronic spreadsheet comprises (i) identifying the range, (ii) collecting required metadata, (iii) adding a layer with the data contents of the range, (iv) adding a secondary layer based on the metadata, and (v) selecting the secondary layer. The method for enabling a layering capability for a given range of an electronic spreadsheet is described in further detail below, by reference to FIG. 3.

In some embodiments, the method for copying layer contents to a defined range that the layer applies to in an electronic spreadsheet comprises (i) performing an encryption check and, when encrypted, obtaining an encryption key which, when valid, decrypts the encrypted data of the layer and, when not valid, cancels the operation. When the layer is not encrypted (or has been decrypted), the method for copying layer contents to a defined range that the layer applies to in an electronic spreadsheet continues with (ii) determining whether the layer is a system layer. When the layer is not a system layer, the method for copying layer contents to a defined range that the layer applies to in an electronic spreadsheet continues forward with (iii) copying the layer contents to the defined range, (iv) determining whether there are additional changes, (v) making the changes when there are additional changes, and (vi) completing when there are no additional changes to make. On the other hand, when the layer is a system layer, the method for copying layer contents to a defined range that the layer applies to in an electronic spreadsheet branches forward with (vii) determining whether the system layer contents are current. When the system layer contents are current, the method for copying layer contents to a defined range that the layer applies to in an electronic spreadsheet moves forward with (iii) copying the layer contents to the defined range, (iv) determining whether there are additional changes, (v) making the changes when there are additional changes, and (vi) completing when there are no additional changes to make. However, when the system layer contents are not current, the method for copying layer contents to a defined range that the layer applies to in an electronic spreadsheet continues with (viii) calculating the contents of the layer, followed by (iii) copying the layer contents to the defined range, (iv) determining whether there are additional changes, (v) making the changes when there are additional changes, and (vi) completing when there are no additional changes to make. The method for copying layer contents to a defined range that the layer applies to in an electronic spreadsheet is described in further detail below, by reference to FIG. 4.

In some embodiments, the method for updating cell range contents in a layer and applying the updates to dependent layers comprises (i) taking a snapshot of changed data, (ii) updating the layer with the provided data, and (iii) notifying other layers that a change has occurred. In some embodiments, the method for updating cell range contents in a layer and applying the updates to dependent layers ends after (iii) notifying other layers that a change has occurred. However, when a system layer change is required, some embodiments of the method for updating cell range contents in a layer and applying the updates to dependent layers continues forward with steps for (iv) determining whether any dependency has changed, (v) obtaining the dependency changes when a dependency has changed, and (vi) calculating contents of the layer when no dependency has changed or after obtaining dependency changes. The method for updating cell range contents in a layer and applying the updates to dependent layers then continues by transitioning back to the steps for (ii) updating the layer with the provided data, and (iii) notifying other layers that a change has occurred. Then the method for updating cell range contents in a layer and applying the updates to dependent layers ends. The method for updating cell range contents in a layer and applying the updates to dependent layers is described in further detail below, by reference to FIG. 5.

In some embodiments, when layers contain such system-generated information, the method for calculating layer contents for layers containing information generated by the system is applied to determine their contents. In some embodiments, the method for calculating layer contents for layers containing information generated by the system comprises (i) performing a check of whether dependency values are needed and, when dependency values are not needed, populating the layer with the supplied value and then ending. On the other hand, when dependency values are determined to be needed, the method for calculating layer contents for layers containing information generated by the system transitions over to (ii) retrieving dependency value(s) for the first cell to update, followed by (iii) determining an operation to perform from a plurality of operations comprising substitute, calculate, and mask operations. When the operation is determined be the substitute operation, the method for calculating layer contents for layers containing information generated by the system performs steps for (iv) determining the substitution and then (v) updating the layer cell with the replacement value. When the operation is determined be the calculate operation, the method for calculating layer contents for layers containing information generated by the system performs steps for (vi) calculating the replacement value result by applying the defined algorithm to the dependency values and then (v) updating the layer cell with the replacement value. When the operation is determined be the mask operation, the method for calculating layer contents for layers containing information generated by the system performs steps for (vii) determining the mask and then (v) updating the layer cell with the replacement value. After completing the step for (v) updating the layer cell with the replacement value, the method for calculating layer contents for layers containing information generated by the system proceeds forward to a step for (viii) determining whether the updated layer cell is the last cell to update or not. When the updated layer cell is the last cell to update, then the method for calculating layer contents for layers containing information generated by the system ends. On the other hand, when there are more cells to update, the method for calculating layer contents for layers containing information generated by the system transitions back to a step for (ix) retrieving dependency value(s) for the next cell to update (in lieu of the first cell to update, as described above in the step for (ii) retrieving dependent value(s) for the first cell to update), followed by the subsequent steps to determine the operation and then update the layer cell, as noted above. This cycle repeats until the updated layer cell is the last cell to update, at which point the method for calculating layer contents for layers containing information generated by the system ends. The method for calculating layer contents for layers containing information generated by the system is described in further detail below, by reference to FIG. 6.

In some embodiments, the method for adding a layer and layer contents for a given layer enabled range starts by (i) collecting metadata as required, followed by (ii) determining a layer type of the layer to be added—either a system layer type or a data layer type. When the layer type is the system layer type, the method for adding a layer and layer contents for a given layer enabled range of some embodiments (iii) creates the system layer and then (iv) determines whether the system layer requires dependencies or not. When dependencies are not required, the method for adding a layer and layer contents for a given layer enabled range (v) determines whether selection is required, selecting the layer and ending when selection is required or completing the method for adding a layer and layer contents for a given layer enabled range when selection is not required. On the other hand, when dependencies are (iv) determined to be required, then the method for adding a layer and layer contents for a given layer enabled range of some embodiments (vi) populates the layer with dependencies and moves forward to the step for (v) determining whether selection is required, as noted above. Turning back to the determination (ii) of layer type of the layer to be added, when the layer type is the data layer type, the method for adding a layer and layer contents for a given layer enabled range of some embodiments (vii) determines whether to copy the range contents or not. When the range contents are not copied, the method for adding a layer and layer contents for a given layer enabled range (viii) creates a blank layer and then proceeds to the step for (v) determining whether selection is required, as noted above. On the other hand, when the range contents are determined to be copied, then the method for adding a layer and layer contents for a given layer enabled range (ix) takes a snapshot of the range, followed by (x) determining whether to update the data or not. When the data is not determined to be updated, the method for adding a layer and layer contents for a given layer enabled range of some embodiments (xi) creates a layer with the snapshot data and then proceeds to the step for (v) determining whether selection is required, as noted above. However, when the data is to be updated, the method for adding a layer and layer contents for a given layer enabled range (xii) adjusts the snapshot data as required, (xiii) creates a layer with the adjusted data, and then proceeds to the step for (v) determining whether selection is required, as noted above. When the method for adding a layer and layer contents for a given layer enabled range is done and the population of data is complete, the user has the option to select the layer. The method for adding a layer and layer contents for a given layer enabled range is described in further detail below, by reference to FIG. 7.

In some embodiments, the method for removing a layer is performed for the removal of a layer, as well as disabling of the layering functionality for a given layer enabled range when the layer being removed is the last layer. In some embodiments, the method for removing a layer is performed for the removal of a particular layer and starts by (i) performing a check to determine whether the particular layer is the last layer in a range and, when the particular layer is the last layer in the range, (ii) removing the particular layer enablement from the range. However, when the particular layer is not the last layer in the range, then the method for removing a layer (iii) determines whether the particular layer is currently active or not. When the particular layer is not currently active, the method for removing a layer (iv) removes the particular layer. However, when the particular layer is currently active, the method for removing a layer (v) selects the first available layer (other layer to make active) and (iv) removes the particular layer. Next, the method for removing a layer (vi) notifies other layers that a change has occurred (by removal of the particular layer), which triggers a required system layer change (described above in the method for updating cell range contents in a layer and applying update to dependent layers). Then the method for removing a layer ends. The method for removing a layer is described in further detail below, by reference to FIG. 8.

One of the key aspects to the electronic spreadsheet data variation management and security system and methods for the management and security of data variations in an electronic spreadsheet described in this specification is the ability to secure the data using an encryption algorithm. The electronic spreadsheet data variation management and security system and methods for the management and security of data variations in an electronic spreadsheet allow encryption to be defined within an individual layer, or defined at a higher level, such as the defined range or the workbook, allowing for the encryption setting to apply to more than one layer and more than one range. In some embodiments, this is accomplished by the method for applying encryption to one or more layers. In some embodiments, the method for applying encryption to one or more layers comprises (i) collecting required metadata, (ii) obtaining an encryption key, (iii) storing encryption settings, and then (iv) determining whether the encryption is layer specific encryption or not. When it is layer specific encryption, the method for applying encryption to one or more layers ends. However, when not layer specific encryption, the method for applying encryption to one or more layers (v) updates the layer to point to the encryption settings and then ends. The method for applying encryption to one or more layers is described in further detail below, by reference to FIG. 9.

In some embodiments, the method for removing encryption provides a way to apply removal of an encryption setting. In some embodiments, the method for removing encryption (i) performs a check to determine whether to remove an encryption setting or not and, when not removing an encryption setting, performing a step for (ii) removing a pointer contained in the layer and then ending. However, when removing an encryption setting, the method for removing encryption (iii) determines whether the layer contains an encryption setting or not. When the layer does not contain an encryption setting, the method for removing encryption performs steps for (iv) removing the encryption setting generally, followed by (ii) removing the pointer contained in the layer, followed thereafter by the method for removing encryption ending. On the other hand, when the layer does contain an encryption setting, the method for removing encryption (v) removes the encryption setting from the layer and then ends. The method for removing encryption is described in further detail below, by reference to FIG. 10.

When a user wishes to save their work, any and all data is embedded into the file, allowing it to be retrieved at a future time by the same user or a different user. In some embodiments, leaving at least one layer in each layer enabled range to remain unencrypted improves usability, since the electronic spreadsheet data variation management and security system will automatically select it during the save operation and helps ensure that anyone accessing the file is not confused by viewing encrypted cell contents. In some embodiments, the method for embedding data in a workbook when saving a spreadsheet file with user work comprises (i) performing a check to determine whether there are any layer enabled ranges and, when there are no layer enabled ranges, (ii) determining whether to encrypt metadata or not, followed by (iii) encrypting the metadata when metadata is determined to be encrypted and proceeding the last step, or skipping to the last step when metadata is not determined to be encrypted, with the last step being (iv) embedding the data in the workbook and ending. However, when there are layer enabled ranges, then the method for embedding data in a workbook when saving a spreadsheet file with user work proceeds to (v) identify a first defined range, (vi) identify a first layer in the range, (vii) determine whether to encrypt the layer, (viii) encrypting the layer when the layer is determined to be encrypted, followed by (or skipping the layer encryption when the layer is not determined to be encrypted) the next step of (ix) determining whether the present layer is the last layer in the range and, when not the last layer in the range, (x) identifying the next layer in the range and proceeding accordingly as noted above, or when the present layer is the last layer in the range, moving ahead to the next step of (xi) determining whether the present range is the last defined range which, when not the last defined range, results in the method for embedding data in a workbook when saving a spreadsheet file with user work transitioning back to a step for (xii) identifying the next defined range and proceeding accordingly as noted above, or when the present range is the last defined range, (ii) determining whether to encrypt metadata or not, followed by (iii) encrypting the metadata when metadata is determined to be encrypted and proceeding the last step, or skipping to the last step when metadata is not determined to be encrypted, with the last step being (iv) embedding the data in the workbook and ending. The method for embedding data in a workbook when saving a spreadsheet file is described in further detail below, by reference to FIG. 11.

In some embodiments, the method for encrypting a layer comprises (i) determining whether a present layer is active or not. When the present layer is active, the method for encrypting a layer (ii) selects an unencrypted layer for the range and proceeds to (iii) encrypt the layer contents. The encryption is done by an encryption key in connection with an encryption algorithm. On the other hand, when the present layer is not active, the method for encrypting a layer skips ahead to the step for (iii) encrypting the layer contents with the encryption key. After encrypting the layer contents, the method for encrypting a layer (iv) determines whether the encryption key is needed elsewhere or not. When the encryption key is not needed elsewhere, the method for encrypting a layer of some embodiments (v) deletes the encryption key and ends. On the other hand, when the encryption key is needed elsewhere, the method for encrypting a layer (vi) identifies the next layer to be encrypted and transitions back to the (i) determination of whether the (next) layer is active or not, and proceeds accordingly, as described above. The method for encrypting a layer is described in further detail below, by reference to FIG. 12.

In some embodiments, the user is allowed to select a combination of layers from layer enabled ranges which are managed as a group, thus enhancing the scenario management capabilities of the electronic spreadsheet data variation management and security system. In some embodiments, the method for selecting a combination of layers managed as a group shows how the electronic spreadsheet data variation management and security system will go about selecting all of the desired layers across the applicable layer enabled ranges for the group. In some embodiments, the method for selecting a combination of layers managed as a group starts by selection of a group and includes steps for (i) identifying a first range in the group, (ii) determining the range layer able to be selected or not and, when the range layer is not selectable, the method for selecting a combination of layers managed as a group ends. However, when the range layer can be selected, the method for selecting a combination of layers managed as a group (iii) determines whether the present range in the group is the last range in the group. When the present range in the group is not the last range in the group, the method for selecting a combination of layers managed as a group transitions back to a step for (iv) identifying the next range in the group (in lieu of the first range in the group), and proceeds according to the steps described above. On the other hand, when the present range is the last range in the group, then the method for selecting a combination of layers managed as a group (v) identifies (or re-identifies) the first range in the group and then (vi) selects the defined layer for the identified range, followed by a step to (vii) determine whether the identified range is the last range in the group or not. When the identified range is the last range in the group, the method for selecting a combination of layers managed as a group ends. On the other hand, when the identified range is not the last range in the group, then the method for selecting a combination of layers managed as a group transitions back to a step for (viii) identifying the next range in the group, and proceeds according to the steps following (v) identification (or re-identification) of the first range in the group, as noted above, until completion of the method for selecting a combination of layers managed as a group. The method for selecting a combination of layers managed as a group is described in further detail below, by reference to FIG. 13.

In some embodiments, the method for substituting a supplied cell value with a system generated alternative value comprises (i) looking up a substitution value and (ii) determining whether the substitution value is found or not. When the substitution value is found, the method for substituting a supplied cell value with a system generated alternative value (iii) returns the substitution value and then the method for substituting a supplied cell value with a system generated alternative value ends. On the other hand, when the substitution value is not found, the method for substituting a supplied cell value with a system generated alternative value (iv) creates a substitution value and then (v) updates the substitution value table, followed by (iii) returning the substitution value. Then the method for substituting a supplied cell value with a system generated alternative value ends. The method for substituting a supplied cell value with a system generated alternative value is described in further detail below, by reference to FIG. 14.

In some embodiments, the method for translating a supplied cell value with a masked equivalent comprises steps for (i) identifying a first character in a dependency value, (ii) determining whether to replace the identified character, (iii) replacing the identified character with a masking character when the identified character is determined to be replaced, and after replacing the identified character with the masking character or after determining that the identified character is not to be replaced, (iv) determining whether the identified character is the last character of the dependency value or not. When the identified character is not the last character, the method for translating a supplied cell value with a masked equivalent transitions back up to a step for (v) identifying the next character from the dependency value and proceeding according to the steps described above. On the other hand, when the identified character is the last character of the dependency value, the method for translating a supplied cell value with a masked equivalent of some embodiments continues forward with (vi) determining whether to apply additional formatting or not and either ending when additional formatting is not to be applied or, when additional formatting is determined to be to applicable, (vii) applying the additional formatting. Then the method for translating a supplied cell value with a masked equivalent ends. The method for translating a supplied cell value with a masked equivalent is described in further detail below, by reference to FIG. 15.

By way of background, as the future for any given company is never entirely certain, it is helpful to lay out alternative combinations of certain unknown values, so that the range of possible outcomes can be reviewed quickly and easily. Of particular interest to the present invention is this problem of scenario modeling, while securing the data to ensure compliance with legal, regulatory, or business requirements.

One approach to this challenge is offered by the scenario manager feature found in Microsoft™ Excel™, which allows the user to designate a specific set of "uncertain" cells, in a model, and assign combinations of values to each uncertain cell. Each combination of values becomes a particular scenario. The user then instructs the manager which outputs they are interested in; the system, in turn, builds a table showing the impact of each named scenario on each designated output cell.

Although powerful, the scenario manager feature is limited to operating on thirty-two (32) cells, is cumbersome to manage and make updates, requiring multiple mouse click operations and dialog box navigation, and does not offer any capability to secure the information it contains. This is partially compensated for by the worksheet protection feature; however, this does not prevent the user from being able to view the information, which may be in violation with legal, regulatory, or business requirements.

In contrast to these just-described tools, the electronic spreadsheet data variation management and security system and methods for the management and security of data variations in an electronic spreadsheet of the present disclosure provides more powerful and interactive approaches to scenario analysis and data protection in the form of a Layer Manager. The Layer Manager automatically tracks any changes made to any cells within the spreadsheet, makes a determination on what to do with that information, and acts accordingly.

By way of example, FIG. 1 conceptually illustrates the layering capability of the electronic spreadsheet data variation management and security system 100, with the layering demonstrated for a given range and where each layer may include a variation of data for a given range. Specifically as shown in this figure, the layering capability of the electronic spreadsheet data variation management and security system 100 is demonstrated by way of a worksheet with multiple layers of a defined range of cells, which in this example is referred to as the layer enabled range (or the "capture area").

For changes made to the cells within the "capture area", the electronic spreadsheet data variation management and security system 100 determines if changes are permissible, and if so, stores the current changes in the layer that is currently active. However, in the event changes are not permissible, the electronic spreadsheet data variation management and security system 100 rejects the changes and reverts the cells back to their prior contents.

Regardless of the "capture area", the electronic spreadsheet data variation management and security system 100 compares the changes against pre-defined patterns to determine whether the user should be made aware that the data may fall into a protected category, as defined by laws, regulations, or business requirements. When such a match occurs, the electronic spreadsheet data variation management and security system 100 alerts the user that the data entered may fall into a protected category, and advises the user on a course of action to protect the information in a manner consistent with the governing requirements.

In some embodiments, the electronic spreadsheet data variation management and security system 100 comprises a computer system on which the electronic spreadsheet software application runs to provide the layering capability. The computer system includes at least a central processor, a main memory, an input/output controller, a keyboard (physical or virtual), a pointing device (e.g., mouse, touch screen, or the like), a display device (e.g., monitor, touchscreen display, etc.), and a storage device (local or remote). In some embodiments, the computer system also includes a network interface that permits the transmission and reception of each spreadsheet file. In some embodiments, the computer system includes or is communicably connected to other devices, such as a printer which could be used to output the contents of the file to a hard copy medium.

In addition to the system hardware for the computer system, the electronic spreadsheet data variation management and security system 100 may run in connection with application software that is supported by a particular operating system which provides a graphical user interface, and supports a presentation layer that communicates directly with the kernel of the computer system to pass information and control commands to and from the user input devices, such as the keyboard and pointing device, or display device, etc., to the application software, and provide feedback from the application to the user through the graphical user interface. Examples of operating system aboard which an electronic spreadsheet software application with the electronic spreadsheet data variation management and security system 100 and interface implementations of the methods for the management and security of data variations in an electronic spreadsheet are supported include, without limitation, Microsoft™ Windows™ operating system, macOS™, Linux, Unix, or other such operating system for the system hardware.

Many of the examples and descriptions which follow focus on implementations of the methods for the management and security of data variations in an electronic spreadsheet as add-in/integration into to the Microsoft™ Excel™ spreadsheet application. Those skilled in the art will find that the electronic spreadsheet data variation management and security system and methods for the management and security of data variations in an electronic spreadsheet of this disclosure may be advantageously applied to a variety of system and application software, including alternative spreadsheet applications, data management systems, word processors, presentation systems, and the like. Moreover, the electronic spreadsheet data variation management and security system and methods for the management and security of data variations in an electronic spreadsheet may be embodied on a variety of different platforms, for example delivered via a web interface rather than an application executing locally on the user's computer system. Therefore, the description of the exemplary embodiments of the electronic spreadsheet data variation management and security system and methods for the management and security of data variations in an electronic spreadsheet which follow are for purposes of illustration and not limitation.

Furthermore, given the familiarity of the Microsoft™ Office™ and specifically the Microsoft™ Excel™ user interface, which is emulated in a number of alternative solutions, it is assumed that the user interface elements of the currently available product versions and the basic operation of the spreadsheet application do not require further explanation. The present invention supplements elements within the user interface to allow the user to interact with the methods and operational capabilities of the electronic spreadsheet data variation management and security system and methods for the management and security of data variations in an electronic spreadsheet described in this specification, however, these could be re-imagined to conform to the operating environment of any required solution, so the descriptions of the exemplary embodiments which follow are for purposes of illustration and not limitation.

Embodiments of the electronic spreadsheet data variation management and security system and methods for the management and security of data variations in an electronic spreadsheet described in this specification differ from and improve upon currently existing options. In particular, some embodiments differ by keeping all relevant information in a single document, with granular controls to protect and secure access based on each individual or their role within an organization, thereby eliminating the need for workarounds, and simplifying the management of the contained data. Tracking data as it is being entered, also allows the system to notify the user when protected information is detected, and appropriate action to be taken to ensure compliance with any requirements. Through the provisioning of the layering capability, it is possible for granular access controls and other security measures to be applied to specific parts of the spreadsheet document, thereby allowing a single document to be shared with a broader audience while ensuring each user can only view and operate on the information for which they are entitled to do so. As such, the electronic spreadsheet data variation management and security system and methods for the management and security of data variations in an electronic spreadsheet of the present disclosure generally improves on the lack of functionality within existing products, and the lack of knowledge within the existing user community, which together drive an extensive array of workarounds, often resulting in the duplication or dissection of data, and thereby increasing the chance of introducing errors and inconsistencies. In addition, the many workarounds and so forth tend to increase the chance of inadvertently exposing data that should be protected, while also reducing productivity and amplifying management overhead.

The electronic spreadsheet data variation management and security system and methods for the management and security of data variations in an electronic spreadsheet of the present disclosure may be comprised of the following elements. This list of possible constituent elements is intended to be exemplary only and it is not intended that this list be used to limit the electronic spreadsheet data variation management and security system and methods for the management and security of data variations in an electronic spreadsheet of the present application to just these elements. Persons having ordinary skill in the art relevant to the present disclosure may understand there to be equivalent elements that may be substituted within the present disclosure without changing the essential function or operation of the electronic spreadsheet data variation management and security system and methods for the management and security of data variations in an electronic spreadsheet.

1. A computing device comprising a processing unit and a memory unit.

2. A spreadsheet software application that runs on the processing unit of the computing device.

3. A spreadsheet layering capability software plug-in module that is installed into and integrates with a graphical user interface (GUI) of the spreadsheet software application, providing selectable options for a user of the spreadsheet software application to create, store, use, and protect a single or plurality of spreadsheet layers that provides a single or plurality of data variations in connection with a first set of data information, and monitors for and assists with the protection of data that meets any of the defined protected classifications.

4. Implementations of the methods for the management and security of data variations in an electronic spreadsheet including (i) a high level operation selection and execution method for the management and security of data variations in an electronic spreadsheet, (ii) a method for enabling a layering capability for a given range of an electronic spreadsheet, (iii) a method for copying layer contents to a defined range that the layer applies to in an electronic spreadsheet, (iv) a method for updating cell range contents in a layer and applying the updates to dependent layers, (v) a method for calculating layer contents for layers containing information generated by the system, (vi) a method for adding a layer and layer contents for a given layer enabled range, (vii) a method for removing a layer, (viii) a method for applying encryption to one or more layers, (ix) a method for removing encryption, (x) a method for embedding data in a workbook when saving a spreadsheet file with user work, (xi) a method for encrypting a layer, (xii) a method for selecting a combination of layers managed as a group, (xiii) a method for substituting a supplied cell value with a system generated alternative value, and (xiv) a method for translating a supplied cell value with a masked equivalent.

The electronic spreadsheet data variation management and security system and methods for the management and security of data variations in an electronic spreadsheet of the present disclosure generally works by enhancing the user interface, providing options for the user to select a cell or a plurality of cells within the worksheet, and enabling the layering capability in any of at least three ways. Firstly, the normal layering capability facilitates the option for a plurality of layers to be created each containing its own version of data that the user can switch between as required. Secondly is a redaction layering capability, which extends the previous layering capability by also creating a layer containing values that have no relation to the original data and cannot be edited by the user. Thirdly is an obfuscation layering capability, which extends the layering capability by also creating a layer containing values that in some fashion relate to the original data (masking) or (alternatively) are not related to the original data (redaction), but cannot be edited by the user (like social security where "masking" is applied on several of the original values with some of the values shown as they really exist, or Joe Smith=Person 1, Tim Scott=Person 2, where "substitution" or "replacement" of values is the obfuscation method). Once the layering capability has been established, additional layers can be created or layers can be removed, to suit the needs of the user, while any changes to the data are automatically stored within the layer currently selected. To ensure compatibility with users that do not have the present invention, a single layer for a defined cell or plurality of cells must remain accessible, which is currently defined as the redacted layer, the obfuscated layer, or a layer containing values the author is happy for all users to have access to. This layer is automatically selected when the document is stored on an electronic storage medium, to ensure it is the first view seen when the document is retrieved. All other layers can be encrypted to protect the information within that layer, allowing user access controls to be applied to prevent unauthorized access to a given layer. Each layer can also be protected to prevent any changes from being made, ensuring the integrity of the data for a given layer. In addition to user information layers, calculation layers can also be added, which takes the information held within a single or plurality of layers in the same location, and combines them using one of the defined algorithms. When two or more areas of the spreadsheet have each been enabled for the layering capability, a group can be created specifying which layer from each group should be a member of the group, allowing the user to quickly switch between different scenarios that the layers represent. Finally, data entry for the whole application is monitored and compared to the extensible list of rules in an attempt to identify the entry of information that might be regulated in some fashion, alerting the user and providing capabilities to ensure adequate protection of such information.

To select a layer, the user would select an option within the GUI to display a list of available layers. When generating the list, the system would review the access controls for each layer, including only those layers the user might have access to. Upon selection of the layer, the system will determine if the data held within that layer is encrypted, and obtain the necessary information for the decryption operation to occur. Once the layer is in an unencrypted state, the contents of the layer are displayed in the defined location.

To make the electronic spreadsheet data variation management and security system and methods for the management and security of data variations in an electronic spreadsheet of the present disclosure, one may use the API of the spreadsheet application, create a software application that extends the user interface, providing access to products capabilities. When a range is enabled for the layering capability, an array of data elements is maintained for each layer, copying the data to or from range when a different layer is selected or changes to the data in the range is made by the user. Furthermore, all data entry is monitored, regardless of location in the document, and is compared to a pre-defined set of rules that describe protected information classifications, currently using regular expressions, such that if a match is detected, the user can be alerted and the information protected, using the obfuscation capability. Obfuscation values are calculated from the original value, firstly by converting the value to a string of characters and then either replacing defined characters with a masking character (e.g., "*"), or by substituting the complete string with a replacement string that has a one-to-one relationship with the original. Conversely. redaction layers contain error values, so as to ensure that any dependency calculations do not inadvertently reveal the contents of the protected range, with the option to convert such dependencies to absolute values when the redacted layer is selected and revert to the original formula value when a data layer is selected, which is presently achieved using the layering capability applied to the dependency location. Encryption for the layers or the substitution table is provided using the AES256 algorithm, using either a user defined password, or information concerning the user or organization obtained from the users' computing device or network. Upon saving the spreadsheet document, an unprotected layer is automatically selected, any encryption is applied, and the data from the invention stored within the metadata of the file, allowing complete transparency to the end user.

The electronic spreadsheet data variation management and security system and implementations of the methods for the management and security of data variations in an electronic spreadsheet of the present disclosure are defined to work with Microsoft™ Excel™ used in conjunction with a computing device running the Microsoft™ Windows™ Operating System. In some embodiments, the electronic spreadsheet data variation management and security system and implementations of the methods for the management and security of data variations in an electronic spreadsheet work with Microsoft™ Excel™ across different platforms. In some embodiments, the electronic spreadsheet data variation management and security system and implementations of the methods for the management and security of data variations in an electronic spreadsheet are supported by and work with other electronic spreadsheet applications from different vendors.

To use the electronic spreadsheet data variation management and security system and methods for the management and security of data variations in an electronic spreadsheet of the present disclosure, once the software application is installed, additional options are presented to the user to facilitate access to the features and functions of the invention. For example, an additional tab is added to the Ribbon within Microsoft™ Excel™, providing a series of menus, buttons, etc. divided up into logical groups depending on the type of operation the user may wish to perform, each of which the system will enable or disable depending on the context and validity of that option at a given point in time.

In a preferred embodiment, the electronic spreadsheet data variation management and security system focuses on security. In some embodiments, this focus on security is handled by evaluation of operations performed by users. To ensure that each user (or when system-driven, the system itself) is not able to perform operations which the user (or system) is not permitted to perform and is not able to perform operations which are not relevant at a given point in time, each operation is periodically evaluated by way of the high level operation selection and execution method for the management and security of data variations in an electronic spreadsheet. The high level operation selection and execution method for the management and security of data variations in an electronic spreadsheet is further described below, by reference to FIG. 2. As description of this method shows, even when an operation is selected (or requested), further checks are made to determine the legitimacy of the request. These further checks act as a safeguard and to ensure that any system driven operation is not able to by-pass the security controls. It should, therefore, be assumed that the operational descriptions that follow have already been evaluated in the context of security—to the extent of being permissible and relevant—and are, therefore, permitted.

Figure 2:
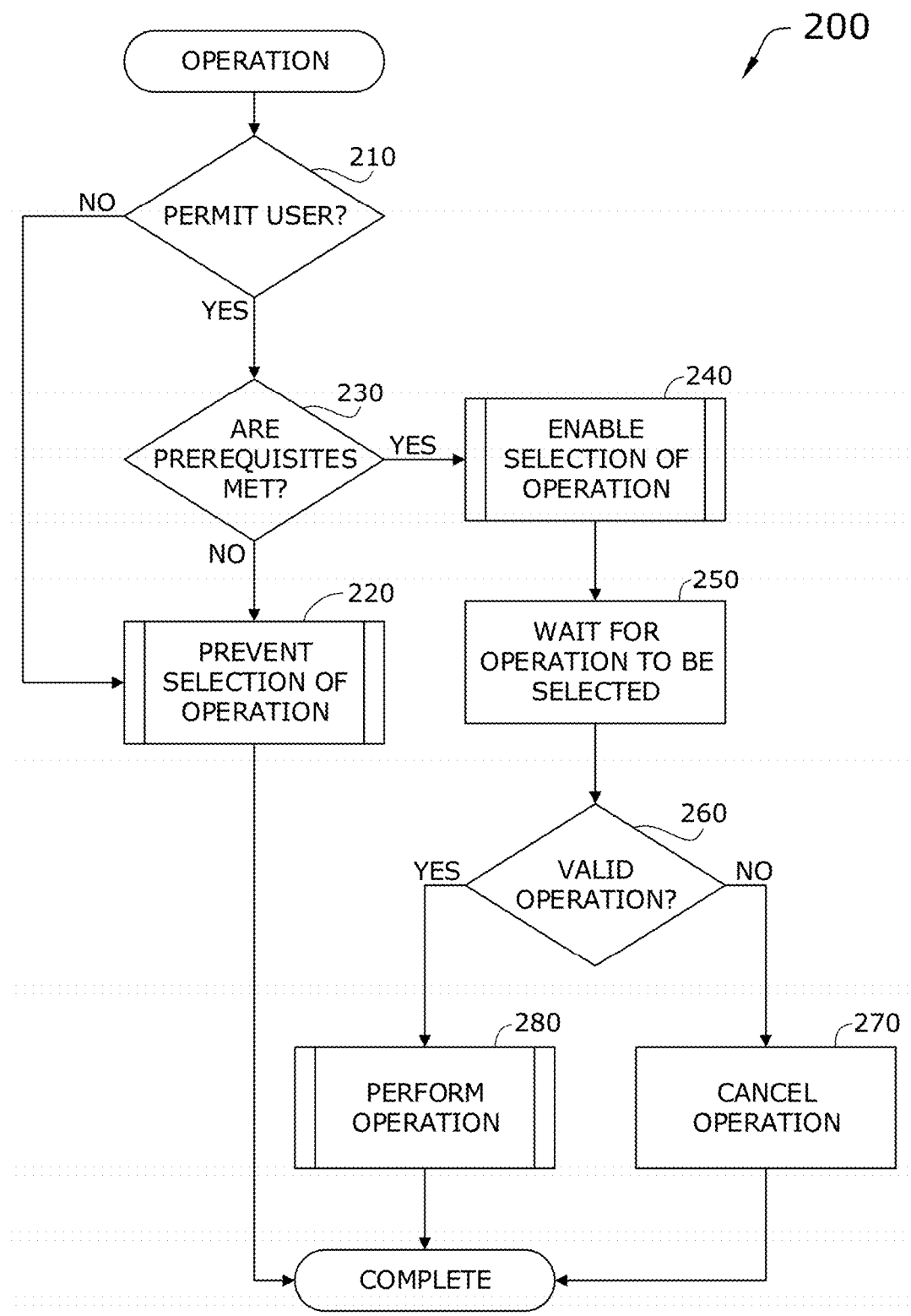
FIG. 2 conceptually illustrates a high level operation selection and execution method for the management and security of data variations in an electronic spreadsheet in some embodiments.

By way of example, FIG. 2 conceptually illustrates a high level operation selection and execution method for the management and security of data variations in an electronic spreadsheet 200. As shown in this figure, the high level operation selection and execution method for the management and security of data variations in an electronic spreadsheet 200 starts with a request to perform an operation. To ensure that the requested operation is permissible, the high level operation selection and execution method for the management and security of data variations in an electronic spreadsheet 200 of some embodiments determines (at 210) whether to permit the user to select and perform the operation. When the user is not permitted to select the operation, the high level operation selection and execution method for the management and security of data variations in an electronic spreadsheet 200 prevents selection of the operation (at 220) and then ends. However, when the user is permitted to select the operation, the high level operation selection and execution method for the management and security of data variations in an electronic spreadsheet 200 determines (at 230) whether prerequisites are met or not. When prerequisites are not met, the high level operation selection and execution method for the management and security of data variations in an electronic spreadsheet 200 prevents selection of the operation (at 220) and then ends.

On the other hand, when the user is permitted to select the operation and it is determined (at 230) that prerequisites are met, then the high level operation selection and execution method for the management and security of data variations in an electronic spreadsheet 200 enables selection of the operation (at 240) and waits for selection of the particular operation (at 250). In some embodiments, even when the user (whether a human user or the system as a user) is permitted to select the operation and the prerequisites for selecting the operation are satisfied, it is possible that performing the particular operation is not relevant. For example, selecting an operation to delete a range of data would not make sense after the data in the range has already been moved (not just copied, but moved) to a totally distinct range of cells. Thus, in some embodiments, the high level operation selection and execution method for the management and security of data variations in an electronic spreadsheet 200 determines (at 260) whether the particular operation is valid or not. When the particular operation is not valid, the high level operation selection and execution method for the management and security of data variations in an electronic spreadsheet 200 cancels the particular operation (at 270) and then ends. However, when the particular operation is determined (at 260) to be valid, the high level operation selection and execution method for the management and security of data variations in an electronic spreadsheet 200 of some embodiments performs the particular operation (at 280). Then the high level operation selection and execution method for the management and security of data variations in an electronic spreadsheet 200 ends.

While the high level operation selection and execution method for the management and security of data variations in an electronic spreadsheet 200 describes general security of operation selection and performance, in general practice, the action of electronic spreadsheet data variation management and security system begins with the user deciding to create a variation of information for a cell or a plurality of cells, which can also be referred to as a range. Having selected the range, the user can enable the layering functionality for the range, which is also referred to as the "capture area" or "layer enabled range" as described above by reference to FIG. 1, so as to distinguish it from other ranges within the same spreadsheet workbook. During layer enabling, additional information is collected, such as a descriptive name and any supporting comments the user wishes to define for the particular capture area. This aids the user when navigating certain other functions of the electronic spreadsheet data variation management and security system.

Figure 3:
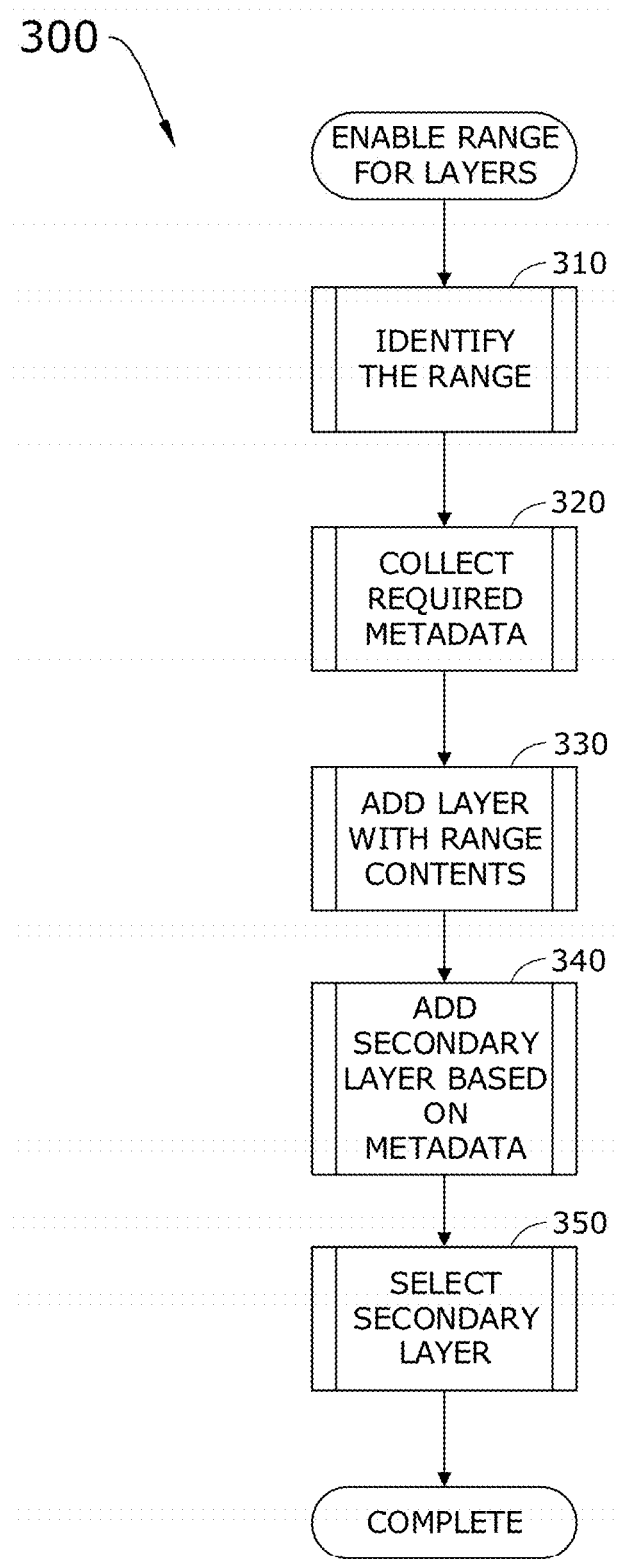
FIG. 3 conceptually illustrates a method for enabling a layering capability for a given range of an electronic spreadsheet in some embodiments.

By way of example, FIG. 3 conceptually illustrates a method for enabling a layering capability for a given range of an electronic spreadsheet 300. The description of the method for enabling a layering capability for a given range of an electronic spreadsheet 300 shown in this figure makes reference directly to FIGS. 4 and 7, and indirectly, reference is made to FIGS. 6, 14, and 15, as well.

Now, starting with FIG. 3, the method for enabling a layering capability for a given range of an electronic spreadsheet 300 begins by identifying the range (at 310) of cells for the capture area. Next, the method for enabling a layering capability for a given range of an electronic spreadsheet 300 collects required metadata (at 320), such as the descriptive name and/or supporting comments which the user intends to define for the capture area.

In some embodiments, the method for enabling a layering capability for a given range of an electronic spreadsheet 300 initially creates two layers—a first layer and a second layer. The first layer is a data layer containing the current contents of the capture area. Thus, the method for enabling a layering capability for a given range of an electronic spreadsheet 300 proceeds to the next step of adding the first layer (at 330) with the range contents.

Figure 7:
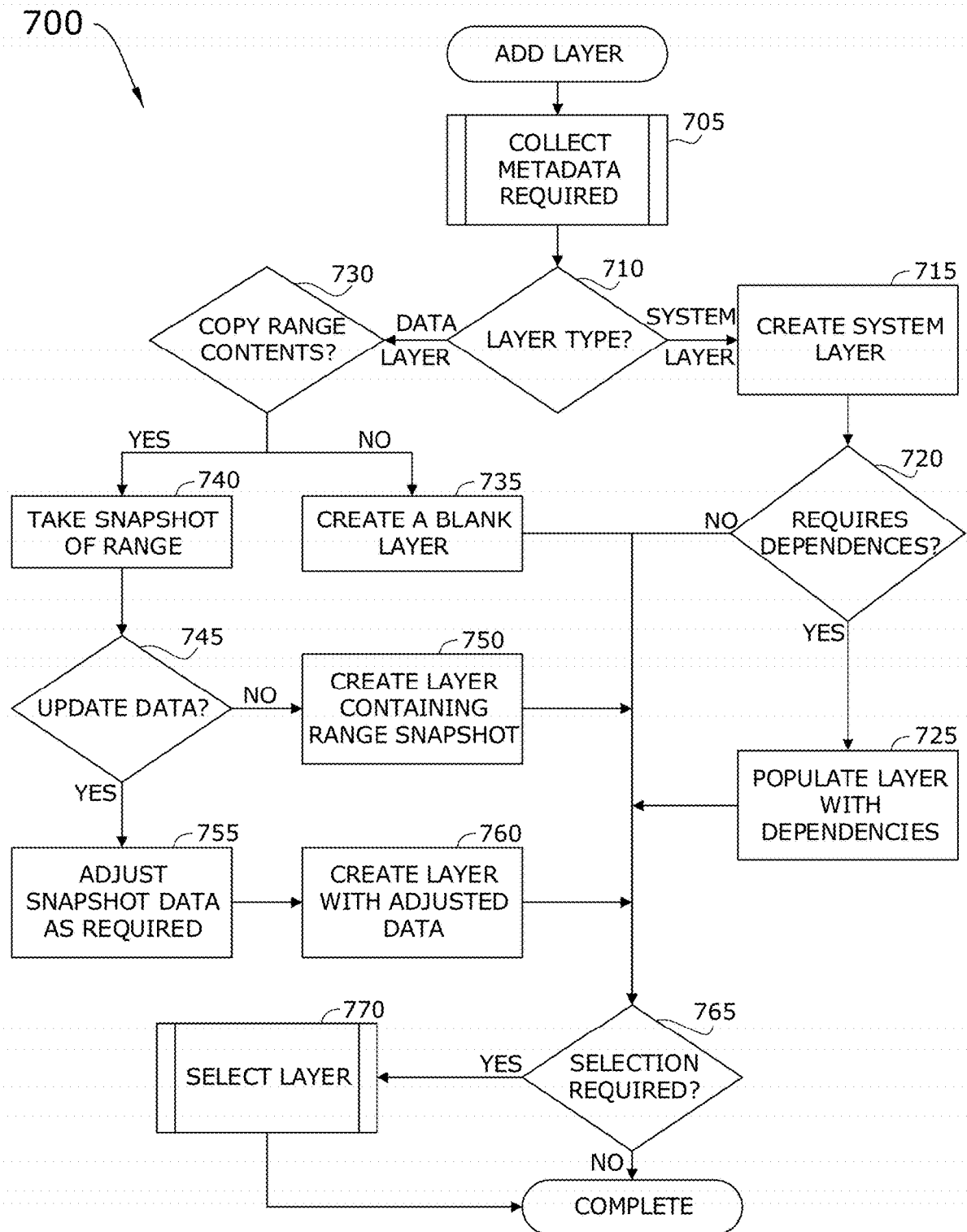
FIG. 7 conceptually illustrates a method for adding a layer and layer contents in some embodiments.

Turning to FIG. 7, a method for adding a layer and layer contents 700 is conceptually illustrated. Notably, the method for adding a layer and layer contents 700 is leveraged once for each of the two initial layers being created by way of the method for enabling a layering capability for a given range of an electronic spreadsheet 300 described in reference to FIG. 3. As shown specifically in FIG. 7, the method for adding a layer and layer contents 700 starts by collecting metadata required (at 705) and then determining (at 710) whether the layer type is a data layer or a system layer. As noted above by reference to FIG. 3, the first layer is a data layer containing the current contents of the capture area. When the layer type is a data layer (as is the case for this first layer), the method for adding a layer and layer contents 700 performs several steps which are described next. In contrast, when the layer type is determined to be a system layer, the method for adding a layer and layer contents 700 performs several different steps. Given that the layer type is determined (at 710) in this case to be a data layer, the method for adding a layer and layer contents 700 of some embodiments determines (at 730) whether to copy the range contents or not. When the range contents are not copied, then the method for adding a layer and layer contents 700 creates (at 735) a blank data layer, followed by determining (at 765) whether selection of the newly created blank data layer is required or not, which results in selection of the layer (at 770) when selection is required, or, when selection is not required, the method for adding a layer and layer contents 700 ends.

Now turning back to the determination (at 730) of whether to copy the range contents or not, when the range contents are to be copied, the method for adding a layer and layer contents 700 of some embodiments takes a snapshot of the range (at 740) and then determines (at 745) whether to leave the data in the range as provided by the snapshot of the range or to update the data of the range. In some embodiments, data layers are freely editable by the user, while system layers can only be modified by the electronic spreadsheet data variation management and security system. When updating the data is not required, the method for adding a layer and layer contents 700 creates the layer with the data of the range snapshot (at 750) and then determines (at 765) whether selection of the newly created data layer is required or not. When selection of the newly created data layer is not required, the method for adding a layer and layer contents 700 simply ends. However, when selection of the data layer is determined (at 765) to be required, the method for adding a layer and layer contents 700 selects (at 770) the layer and then ends.

Returning to the determination (at 745) of whether to update the data in the snapshot of the range or not, when the data is to be updated, then the method for adding a layer and layer contents 700 adjusts (at 755) the snapshot data as required. Then the method for adding a layer and layer contents 700 creates the layer (at 760) with the adjusted data.

Figure 6:
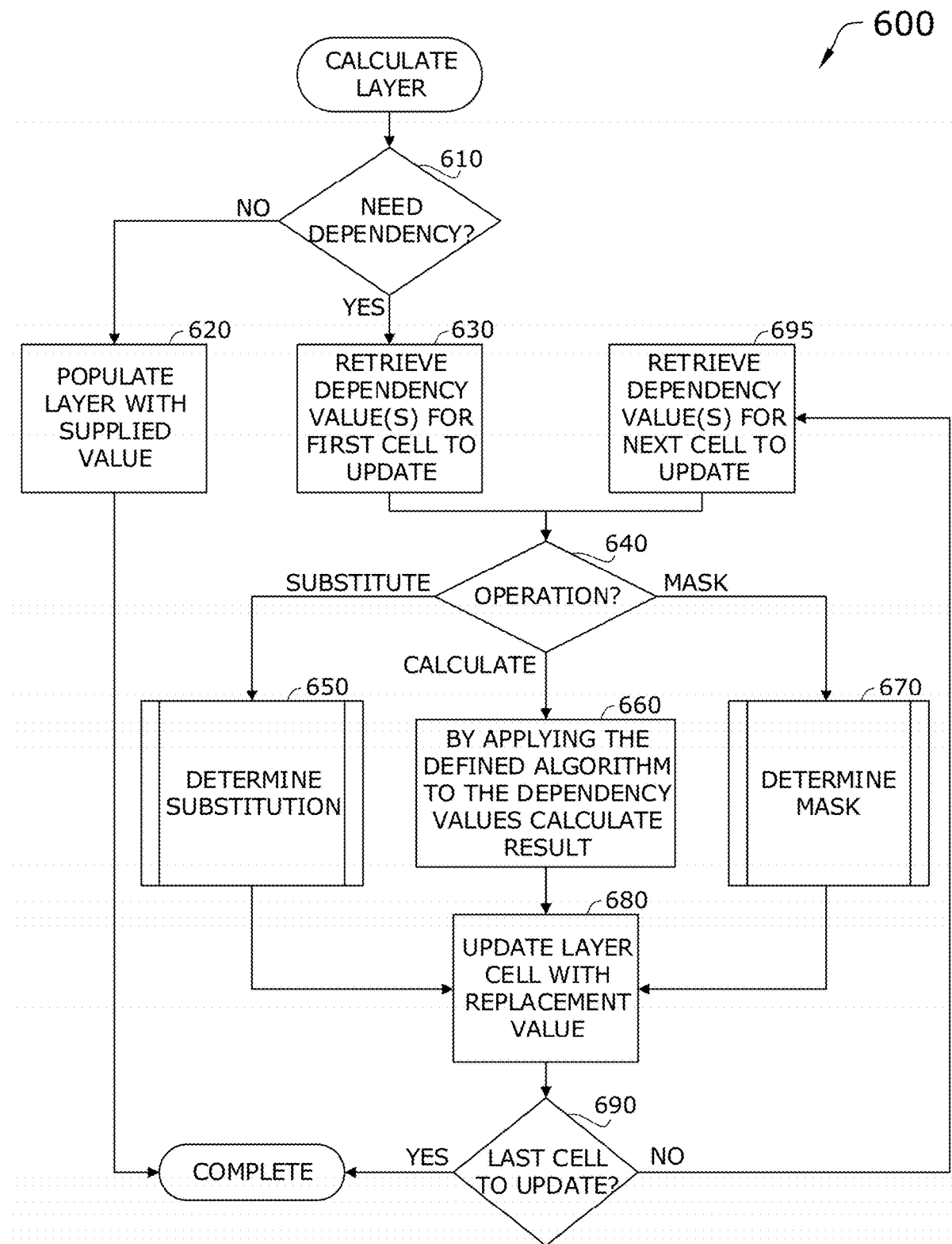
FIG. 6 conceptually illustrates a method for calculating layer contents for layers containing information generated by the system in some embodiments.

Updating data, adjusting the snapshot data, and creating the layer with the adjusted data involve several steps which are described by reference to FIG. 6. Specifically, FIG. 6 conceptually illustrates a method for calculating layer contents for layers containing information generated by the system 600. The description of the method for calculating layer contents for layers containing information generated by the system 600 which follows makes reference to other methods described in connection with FIGS. 14 and 15. As shown in FIG. 6, the method for calculating layer contents for layers containing information generated by the system 600 starts by determining (at 610) whether dependency values are needed in calculating the layer. When dependencies are needed, the method for calculating layer contents for layers containing information generated by the system 600 proceeds through a sequence of steps, which are described further below. On the other hand, when dependencies are not needed, the method for calculating layer contents for layers containing information generated by the system 600 proceeds to the step for populating (at 620) the layer with the supplied value. After populating (at 620) the layer with the supplied value, the method for calculating layer contents for layers containing information generated by the system 600 ends.

Turning back to the determination (at 610) of whether dependency values are needed or not, when dependencies are needed, the method for calculating layer contents for layers containing information generated by the system 600 retrieves (at 630) dependency value(s) for a first cell to update in the capture area range. Next, the method for calculating layer contents for layers containing information generated by the system 600 determines (at 640) which operation to employ for updating the first cell. The types of operations include a substitute operation, a calculate operation, and a mask operation. When the operation is determined (at 640) to be the substitute operation, the method for calculating layer contents for layers containing information generated by the system 600 determines the substitution (at 650) of a replacement value to apply.

Figure 14:
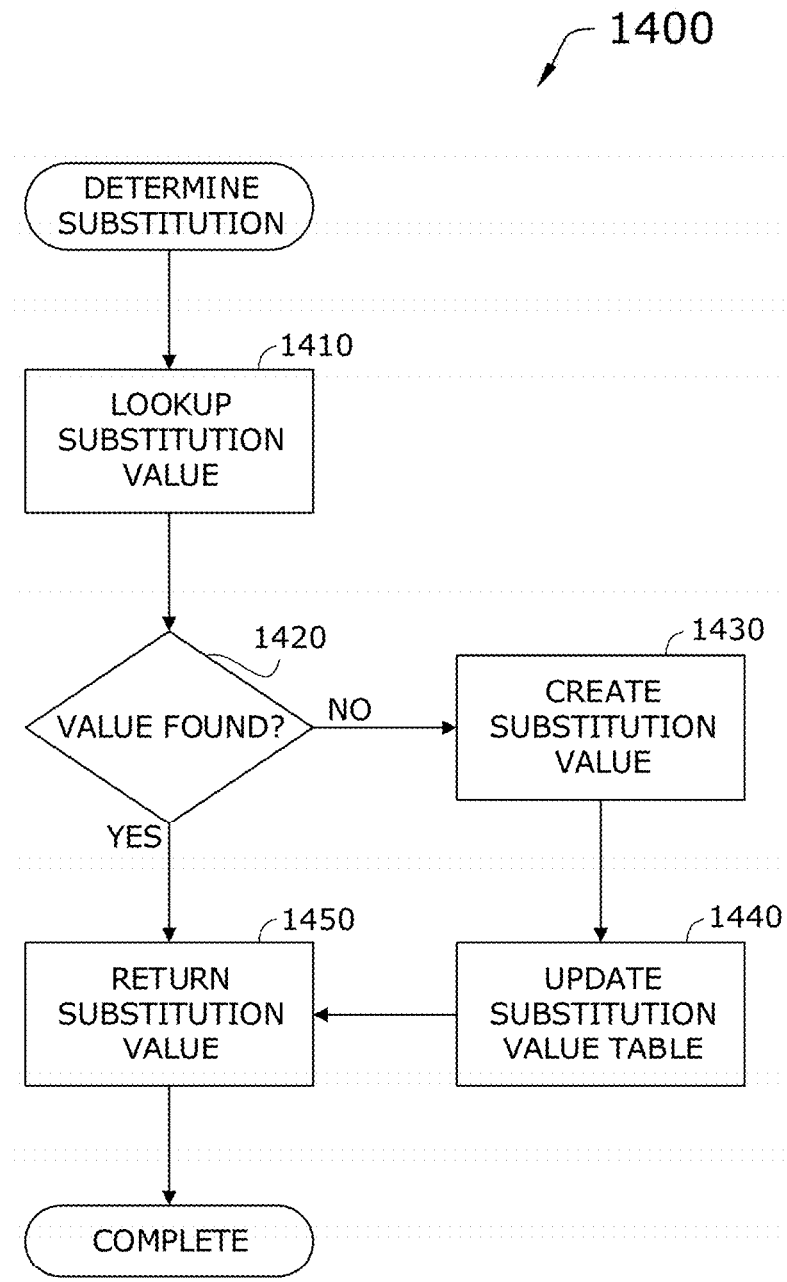
FIG. 14 conceptually illustrates a replacement data obfuscation layer method for substituting a supplied cell value with a system generated alternative value in some embodiments.

By way of example, FIG. 14 conceptually illustrates a method for substituting a supplied cell value with a system generated alternative value 1400. In some embodiments, the method for substituting a supplied cell value with a system generated alternative value 1400 is triggered when the method for calculating layer contents for layers containing information generated by the system 600 performs the step to determine substitution (at 650). In some embodiments, the method for substituting a supplied cell value with a system generated alternative value 1400 performs a step to lookup the substitution value (at 1410). In some embodiments, a substitution value table is referenced to see whether the substitution value is present in the table or not. The substitution value table may be organized as a lookup table (LUT) with entries for substitution values, or paired entries of value-substitution value, and so forth. After looking up the substitution value in the substitution value table, the method for substituting a supplied cell value with a system generated alternative value 1400 then determines (at 1420) whether the substitution value is found in the substitution value table or not.

When the substitution value is not found, the method for substituting a supplied cell value with a system generated alternative value 1400 creates (at 1430) the substitution value and updates (at 1440) the substitution value table with the newly created substitution value. The method for substituting a supplied cell value with a system generated alternative value 1400 then returns the newly created substitution value (1450).

Turning back to the determination (at 1420), when the substitution value is affirmatively found in the substitution value table, then the method for substituting a supplied cell value with a system generated alternative value 1400 returns the substitution value (1450) found in the substitution value table. After returning the substitution value (either the newly created substitution value or the substitution value as retrieved from the substitution value lookup table), the method for substituting a supplied cell value with a system generated alternative value 1400 ends.

Referring back to FIG. 6, when the operation is determined (at 640) to be the calculate operation, the method for calculating layer contents for layers containing information generated by the system 600 calculates the replacement value result (at 660) by applying the defined algorithm to the dependency value(s). When the operation is determined (at 640) to be the mask operation, the method for calculating layer contents for layers containing information generated by the system 600 determines the mask (at 650) to apply to get the replacement value.

Figure 15:
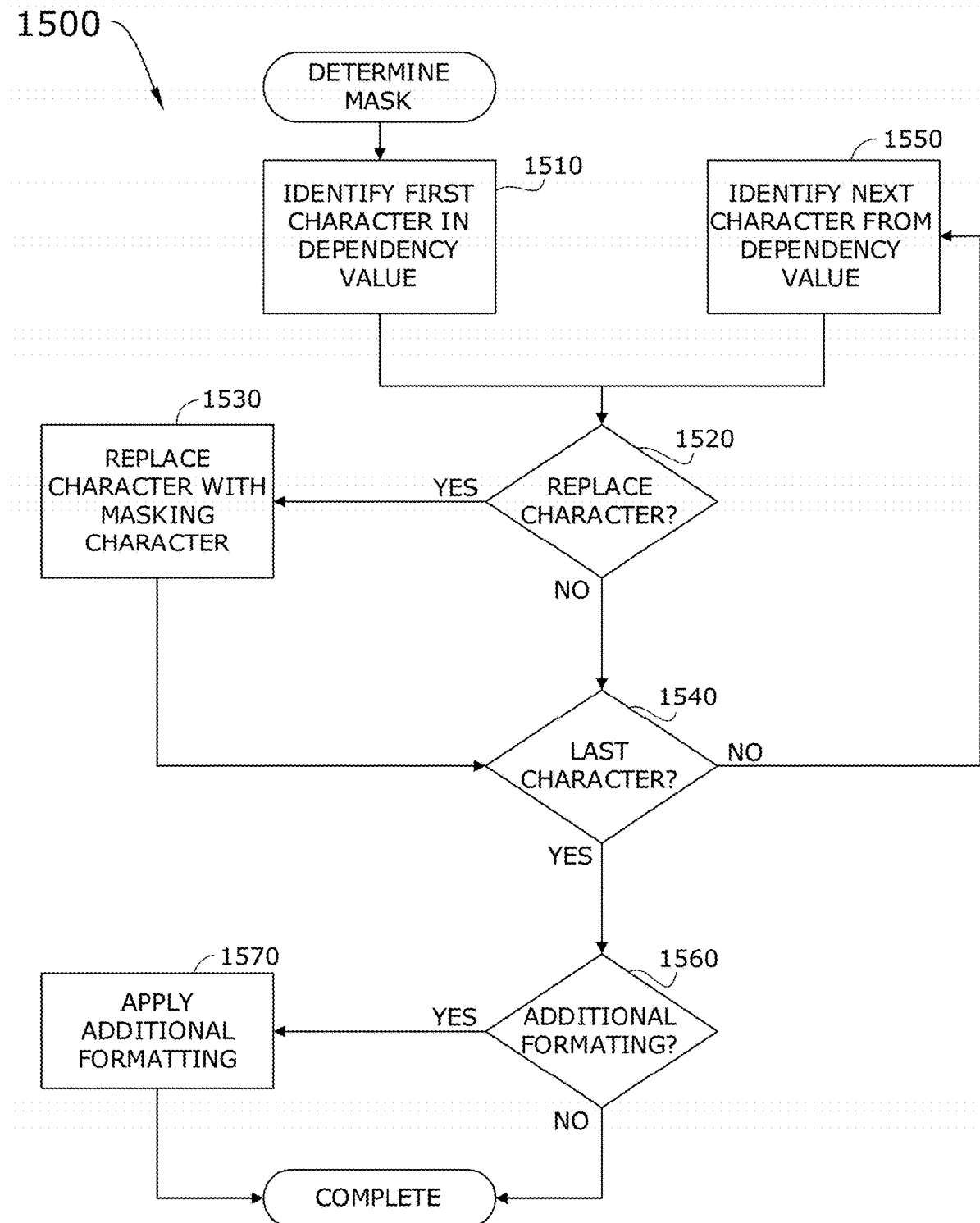
FIG. 15 conceptually illustrates a data masking obfuscation layer method for translating a supplied cell value with a masked equivalent in some embodiments.

By way of example, FIG. 15 conceptually illustrates a method for translating a supplied cell value with a masked equivalent 1500. In some embodiments, the method for translating a supplied cell value with a masked equivalent 1500 is triggered when the method for calculating layer contents for layers containing information generated by the system 600 performs the step to determine the mask (at 670). In some embodiments, the method for translating a supplied cell value with a masked equivalent 1500 starts by identifying a first character in a dependency value (at 1510) and then determines (at 1520) whether to replace the character in the dependency value or not. In some embodiments, one or more characters in the dependency value are replaced by a masking character.

When the character is determined not to be replaced, then the method for translating a supplied cell value with a masked equivalent 1500 proceeds forward to determine (at 1540) whether the present character being evaluated is the last character in the dependency value. When the present character is not the last character in the dependency value, the method for translating a supplied cell value with a masked equivalent 1500 transitions back to a step for identifying (at 1550) the next character from the dependency value, and proceeds through the subsequent steps of determining whether to replace the character as noted above.

However, when the present character is determined (at 1520) to be replaced, the method for translating a supplied cell value with a masked equivalent 1500 then replaces the character with a masking character (at 1530). Examples of masking characters include, without limitation, "*", "#", "●", etc. After replacing the present character with the masking character, the method for translating a supplied cell value with a masked equivalent 1500 transitions to the determination (at 1540) of whether the present character (in this case having been replaced with a masking character) is the last character from the dependency value or not. When not the last character, the method for translating a supplied cell value with a masked equivalent 1500 returns to the steps for identifying (at 1550) the next character in the dependency value, and proceeding accordingly, as described above.

In some embodiments, when the character is determined (at 1540) to be the last character from the dependency value, the method for translating a supplied cell value with a masked equivalent 1500 then moves forward to the next step of determining (at 1560) whether additional formatting is to be applied or not. When additional formatting is not required, the method for translating a supplied cell value with a masked equivalent 1500 ends. However, when additional formatting is determined (at 1560) to be needed, the method for translating a supplied cell value with a masked equivalent 1500 applies the additional formatting (at 1570) and then ends.

Now turning back to FIG. 6, after performing the operation (at 650, 660, or 670), the method for calculating layer contents for layers containing information generated by the system 600 proceeds to the next step of updating the layer cell (at 680) with the replacement value. Next, the method for calculating layer contents for layers containing information generated by the system 600 determines (at 690) whether the present cell is the last cell to update or not. When there are more cells to update, the method for calculating layer contents for layers containing information generated by the system 600 transitions back to the step for retrieving dependency value(s) (at 695) for the cell to update, in this case retrieving the dependency value(s) for the next cell to update (not the first cell to update, as noted above). Thereafter, the method for calculating layer contents for layers containing information generated by the system 600 continues as described above, and repeats the cycle until the last cell has been updated. Then the method for calculating layer contents for layers containing information generated by the system 600 ends.

Returning to the details of FIG. 7, after adjusting (at 755) the snapshot data in the range and creating the layer (at 760) with the adjusted data, the method for adding a layer and layer contents 700 determines (at 765) whether selection of the data layer is required or not. When not required, the method for adding a layer and layer contents 700 ends. In contrast, when selection of the layer is required, the method for adding a layer and layer contents 700 selects (at 770) the layer. Then the method for adding a layer and layer contents 700 ends.

Now turning back to FIG. 3, after creating the first layer, the method for enabling a layering capability for a given range of an electronic spreadsheet 300 adds the second layer (at 340) based on the metadata. The second layer may be any of several different types of layers, including a blank data layer, a data layer which includes a copy of the first layer, a system layer with a redacted copy of the first layer, or a system layer containing an obfuscated copy of the first layer. When the second layer is created as a system layer, a set of steps are performed for creating the system layer that is different from the steps for creating a data layer, which is described above by reference to FIG. 7.

Notably, and again referring to FIG. 7, when the determination (at 710) of what type of layer type to create (either a data layer or a system layer) results in a type of system layer, then the method for adding a layer and layer contents 700 proceeds with the other sequence of steps for creating a system layer, starting with creating the system layer (at 715). The system layer to create can be, for example, a system layer with a redacted copy of the first layer or a system layer with an obfuscated copy of the first layer (a copy which is blurred or obstructed in a way that a user cannot read the data in the capture area range of cells). In some embodiments, the method for adding a layer and layer contents 700 then determines (at 720) whether the newly created system layer requires dependencies or not. When dependencies are not required, the method for adding a layer and layer contents 700 proceeds ahead to the step for determining (at 765) whether selection of the newly created system layer is required or not. When not required, the method for adding a layer and layer contents 700 ends. However, when selection of the new system layer is determined (at 765) to be required, the method for adding a layer and layer contents 700 proceeds to select the layer (at 770), after which the method for adding a layer and layer contents 700 ends.

Returning to the determination (at 720) of whether the new system layer requires dependencies or not, when dependencies are required, the method for adding a layer and layer contents 700 populates (at 725) the newly created system layer with the dependencies and proceeds to the next step of determining (at 765) whether selection of the system layer is required or not. When selection of the newly created system layer is not required, the method for adding a layer and layer contents 700 ends. However, when selection of the new system layer is determined (at 765) to be required, the method for adding a layer and layer contents 700 proceeds to select the system layer (at 770), after which the method for adding a layer and layer contents 700 ends.

Referring back to FIG. 3, after creating and adding the second layer, the method for enabling a layering capability for a given range of an electronic spreadsheet 300 of some embodiments proceeds to select the second layer (at 350). Selection of a layer is described below, by reference to FIG. 4. After creating the first and second layers and selecting the second layer, the user is enabled to freely switch between the defined layers, which will update the contents of the capture area with the contents of the layer, using a method as described below, by reference to FIG. 4.

Figure 4:
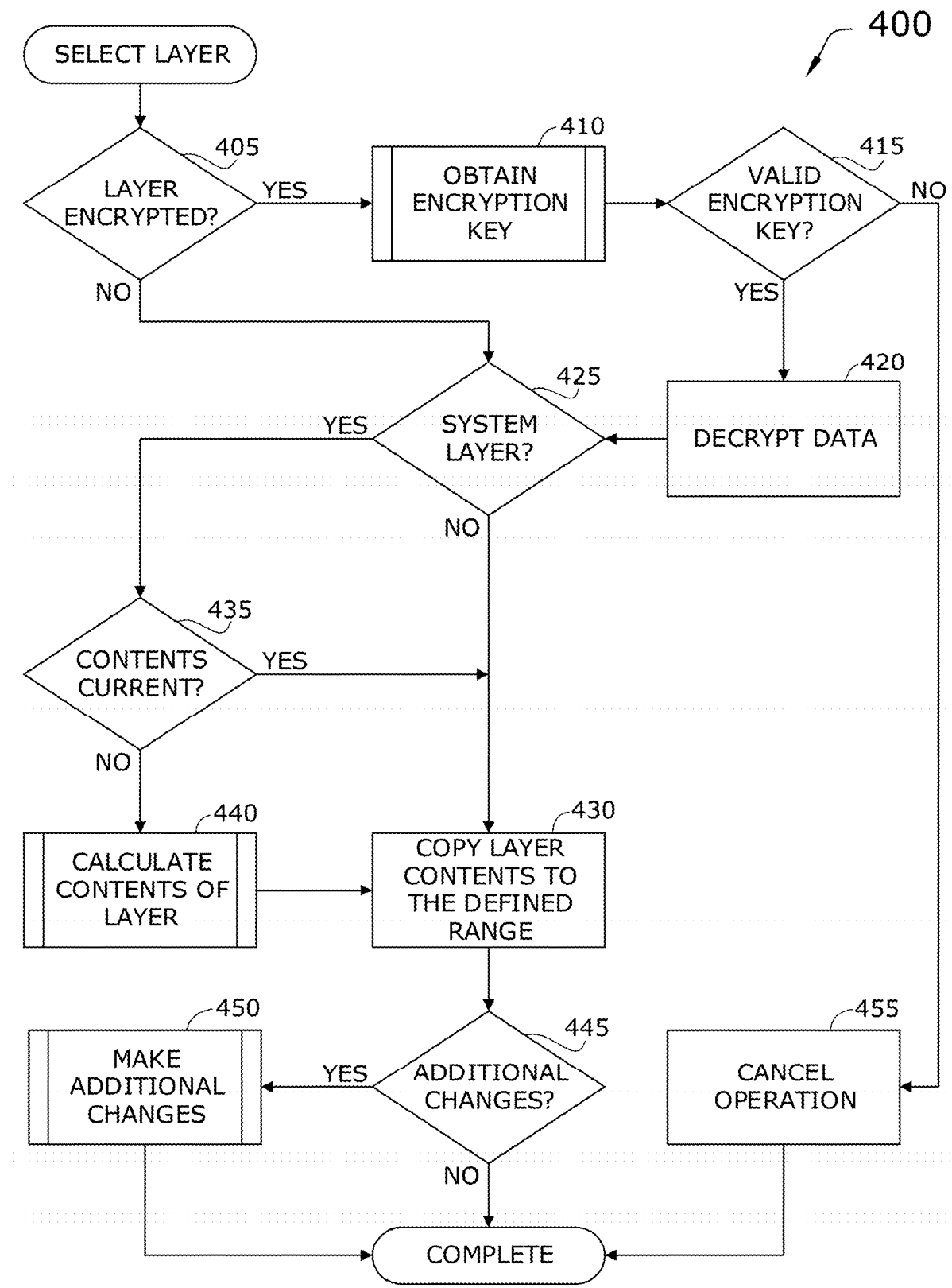
FIG. 4 conceptually illustrates a method for selecting and copying the layer contents to a defined range that the layer applies to in an electronic spreadsheet in some embodiments.

By way of example, FIG. 4 conceptually illustrates a method for selecting and copying the layer contents to a defined range that the layer applies to in an electronic spreadsheet 400. Assuming the layer is selected, the method for selecting and copying the layer contents to a defined range that the layer applies to in an electronic spreadsheet 400 starts by determining (at 405) whether the layer is encrypted or not. When the layer is not encrypted, the method for selecting and copying the layer contents to a defined range that the layer applies to in an electronic spreadsheet 400 proceeds to a step for determining (at 425) whether the layer is a system layer, which is described further below. However, when the layer is determined (at 405) to be encrypted, then the method for selecting and copying the layer contents to a defined range that the layer applies to in an electronic spreadsheet 400 obtains the encryption key (at 410) and determines (at 415) whether the encryption key is valid or not. When the encryption key is not valid, the method for selecting and copying the layer contents to a defined range that the layer applies to in an electronic spreadsheet 400 cancels the operation (at 455) and ends. However, when the encryption key is valid, the method for selecting and copying the layer contents to a defined range that the layer applies to in an electronic spreadsheet 400 uses the encryption key to decrypt the data (at 420) of the layer.

In some embodiments, the method for selecting and copying the layer contents to a defined range that the layer applies to in an electronic spreadsheet 400 determines (at 425) whether the selected layer is a system layer or not. When the selected layer is not a system layer (but is instead a data layer), the method for selecting and copying the layer contents to a defined range that the layer applies to in an electronic spreadsheet 400 proceeds to copy (at 430) the layer contents to the defined range of the capture area. On the other hand, when the selected layer is determined (at 425) to be a system layer, then the method for selecting and copying the layer contents to a defined range that the layer applies to in an electronic spreadsheet 400 performs a step for determining (at 435) whether the contents of layer are current or not. When the layer contents are current, the method for selecting and copying the layer contents to a defined range that the layer applies to in an electronic spreadsheet 400 proceeds to copy (at 430) the layer contents to the defined range, as described above. However, when the contents of the layer are determined (at 435) not to be current, then the method for selecting and copying the layer contents to a defined range that the layer applies to in an electronic spreadsheet 400 performs a step for calculating the contents of the layer (at 440). In some embodiments, the step for calculating the contents of the layer (at 440) when the contents of the layer are not current invokes the method for calculating layer contents for layers containing information generated by the system 600, described above by reference to FIG. 6. After calculating the contents of the layer (at 440), the method for selecting and copying the layer contents to a defined range that the layer applies to in an electronic spreadsheet 400 performs the step for copying (at 430) the layer contents to the defined range, as described above.

In some embodiments, after copying (at 430) the layer contents to the defined range, the method for selecting and copying the layer contents to a defined range that the layer applies to in an electronic spreadsheet 400 determines (at 445) whether there are any additional changes to make. When there are no additional changes, the method for selecting and copying the layer contents to a defined range that the layer applies to in an electronic spreadsheet 400 ends. However, when there are additional changes, the method for selecting and copying the layer contents to a defined range that the layer applies to in an electronic spreadsheet 400 makes the additional changes (at 450) and then ends. In some embodiments, making additional changes (at 450) is possible by the user when the selected layer is a data layer. In that case, the user is permitted to make changes to any cell or to multiple cells within the capture area. When a change is made, either by typing a new formula or value into a cell, or when using the copy/paste functionality of the Windows™ Operating System, the electronic spreadsheet data variation management and security system leverages a method, described below by reference to FIG. 5, to process these updates, storing the updated data in the currently selected layer.

Figure 5:
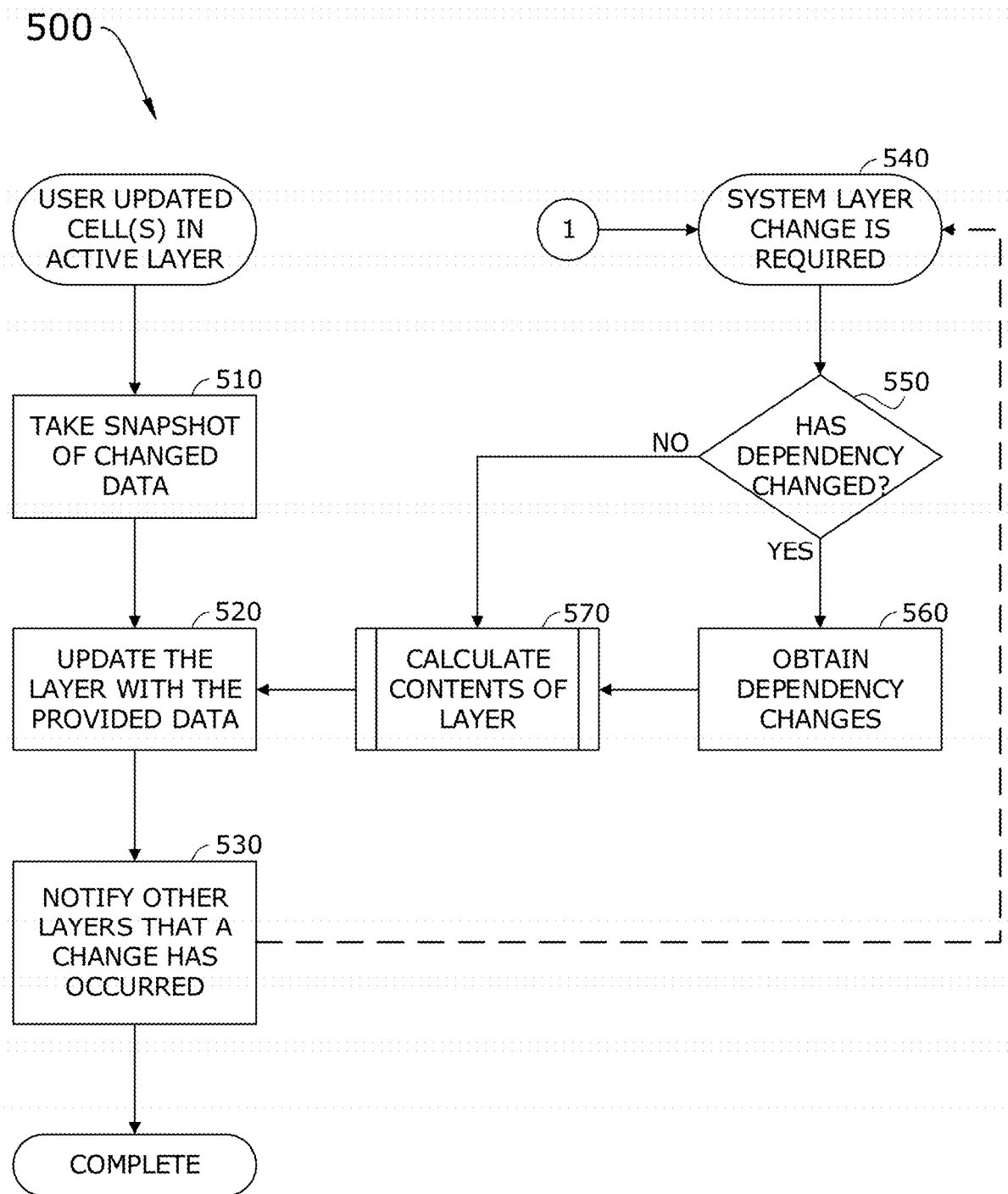
FIG. 5 conceptually illustrates a method for updating cell range contents in a layer and applying the updates to dependent layers in some embodiments.

By way of example, FIG. 5 conceptually illustrates a method for updating cell range contents in a layer and applying the update to dependent layers 500. In some embodiments, the method for updating cell range contents in a layer and applying the update to dependent layers 500 starts when a user updates one or more cells in an active (selected) layer. As shown, the method for updating cell range contents in a layer and applying the update to dependent layers 500 takes a snapshot of the changed data (at 510) and then updates the layer with the provided data (at 520). After the layer is updated with the provided data, the method for updating cell range contents in a layer and applying the update to dependent layers 500 notifies other layers (at 530) that a change has occurred. In some embodiments, no dependencies are affected by the update to the active layer and the method for updating cell range contents in a layer and applying the update to dependent layers 500 ends. However, notifying other layers of the change to the active layer, the method for updating cell range contents in a layer and applying the update to dependent layers 500 checks for system layer changes that are required (at 540) and then determines (at 550) whether any dependency has changed as a result of the update to the active layer. When no dependency has changed, the method for updating cell range contents in a layer and applying the update to dependent layers 500 calculates the contents of the system layer (at 570) and returns to the step for updating (at 520) the layer with the provided data, and continues through to the end. However, when a dependency is determined (at 550) to have changed, then the method for updating cell range contents in a layer and applying the update to dependent layers 500 proceeds to a step for obtaining the dependency changes (at 560), followed by calculating (at 570) the contents of the system layer and proceeding to update (at 520) the layer with the provided data, notifying the other layers of the change (at 530) and then ending.

In some embodiments, when additional variations of data are required, the user can choose to add further layers as needed. When the user chooses to add a layer, the method for adding a layer and layer contents 700, described above by reference to FIG. 7, is invoked. In some embodiments, an option to create calculation layers is provided by the electronic spreadsheet data variation management and security system for user selection when the user chooses to add a new layer and two or more layers are already present. Calculation layers are another type of system layer supported by the electronic spreadsheet data variation management and security system. In addition to the empty and copy layer options, calculation layers are provided when there are two or more layers. Specifically, calculation layers leverage common mathematical operations, such as addition and multiplication, to calculate a result value when applied to a selected layer or to multiple selected layers within the current capture area. In addition to mathematical operations for addition and multiplication, more complex mathematical operations or algorithms are provided by the electronic spreadsheet data variation management and security system.

In some embodiments, when a calculation layer is selected by the user, additional controls are provided by the electronic spreadsheet data variation management and security system and presented within the user interface to allow the user to update which layer or layers should be leveraged to calculate the desired result, and the mathematical operation that should be applied. This ability to rapidly make adjustments, on-the-fly, enhances the modeling and associated thought processes associated with the produced results.

In some embodiments, the electronic spreadsheet data variation management and security system supports removal of a layer that is no longer required or removal of multiple layers that are no longer required. An example of a method for removing a layer is described below, by reference to FIG. 8. In some embodiments, layer removal is possible by removing the currently selected (active) layer. In some embodiments, removal of a layer is provided in the form of a dialog box, which lists all of the layers for the current capture area and allows the user to select which layer or layers to remove. When the user invokes the method for removing a currently selected (active) layer, some embodiments of the electronic spreadsheet data variation management and security system automatically select another layer that is available to the user. Also, when the layer being removed is the last layer defined for the capture area, the layering functionality for the defined capture area will be disabled, leaving the currently visible formulas and values behind in what was the defined capture area.

Figure 8:
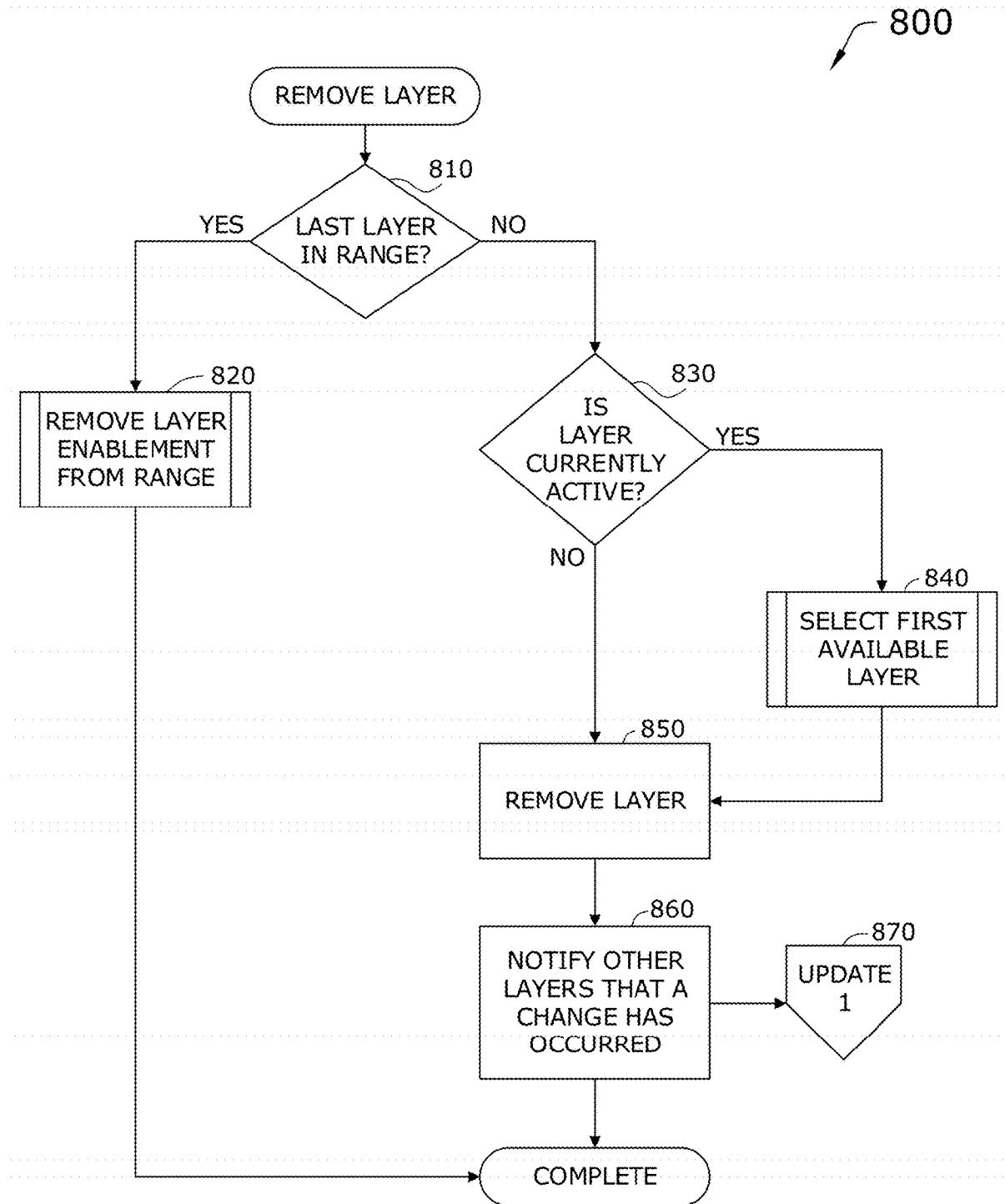
FIG. 8 conceptually illustrates a method for removing a layer in some embodiments.

By way of example, FIG. 8 conceptually illustrates a method for removing a layer 800. As shown in this figure, the method for removing a layer 800 starts by determining (at 810) whether the layer to be removed is the last layer in the range or capture area. When the layer to be removed is the last layer in the range, the method for removing a layer 800 removes layer enablement from the range (at 820) and then ends. On the other hand, when the layer to be removed is determined (at 810) not to be the last layer in the range, the method for removing a layer 800 then determines (at 830) whether the layer to be removed is the currently active (selected) layer or not. When the layer to be removed is not the currently active (selected) layer, the method for removing a layer 800 performs a step for removing (at 850) the layer. However, when the layer to be removed is the currently active (selected) layer, the method for removing a layer 800 automatically selects a first available layer, and then proceeds to remove the layer (at 850). After removing the layer (at 850), the method for removing a layer 800 notifies other layers (at 860) that a change has occurred. In some embodiments, additional dependency and system layer processing for the change follows the "UPDATE 1" step 870, which refers back to an encircled entry point ("1") into the method for updating cell range contents in a layer and applying the update to dependent layers 500, described above by reference to FIG. 5. Then the method for removing a layer 800 ends.

One key aspect for protecting the data contents of various layers when using of the electronic spreadsheet data variation management and security system is the ability to encrypt the data held within a layer. A method for applying encryption to one or more layers is described below, by reference to FIG. 9, and provides details as to how the electronic spreadsheet data variation management and security system supports and defines encryption of layers. For a complex spreadsheet workbook in conventional systems (i.e., not by way of the electronic spreadsheet data variation management and security system or the methods for the management and security of data variations in an electronic spreadsheet of the present disclosure), in which the complex spreadsheet workbook may involve multiple capture areas, each with multiple layers, it would be cumbersome to define a different password for each and every layer that requires protection. To overcome this challenge, the electronic spreadsheet data variation management and security system of the present disclosure permits the encryption to be defined anywhere within the hierarchical model supported by the electronic spreadsheet data variation management and security system, thereby allowing for a combination of encryption capabilities to be applied throughout the environment. As an example, a password would be defined as the encryption key and assigned to the workbook, with each layer pointing to this as their encryption key, while also allowing highly confidential layers to be protected with a different password.

Figure 9:
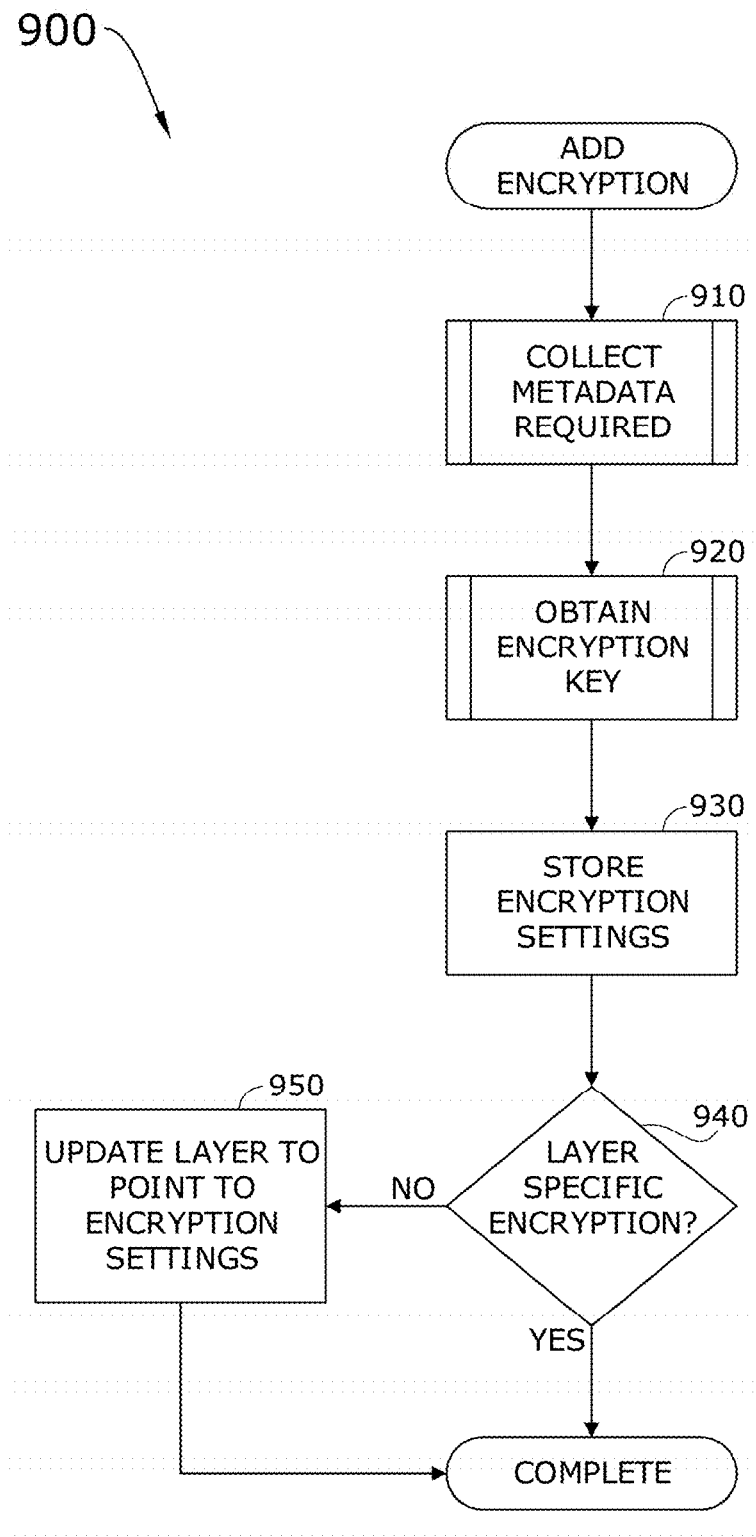
FIG. 9 conceptually illustrates a method for applying encryption to one or more layers in some embodiments.

By way of example, FIG. 9 conceptually illustrates a method for applying encryption to one or more layers 900. As shown in this figure, the method for applying encryption to one or more layers 900 starts when a user chooses to add encryption to a layer or multiple layers. In some embodiments, the method for applying encryption to one or more layers 900 collects metadata required (at 910) to add encryption and then obtains an encryption key (at 920) to be used for encrypting the layer or multiple layers. The encryption key of course can later be used to decrypt (or decode) such encrypted layer or layers. Next, the method for applying encryption to one or more layers 900 stores the encryption settings (at 930). In some embodiments, the method for applying encryption to one or more layers 900 determines (at 940) whether the encryption to add is layer specific encryption or not. When the encryption to add is layer specific encryption, the method for applying encryption to one or more layers 900 ends. However, when the encryption to add is not layer specific encryption, the method for applying encryption to one or more layers 900 updates the layer to point to the encryption settings (at 950). Then the method for applying encryption to one or more layers 900 ends. This combination of encryption assignment and linking, while conceptually complex, allows for very granular permissions to be assigned throughout the workbook, allowing a single file to be used in a much broader range of operational situations than is presently available by way of the conventional systems, since many workarounds would no longer be required.

Figure 10:
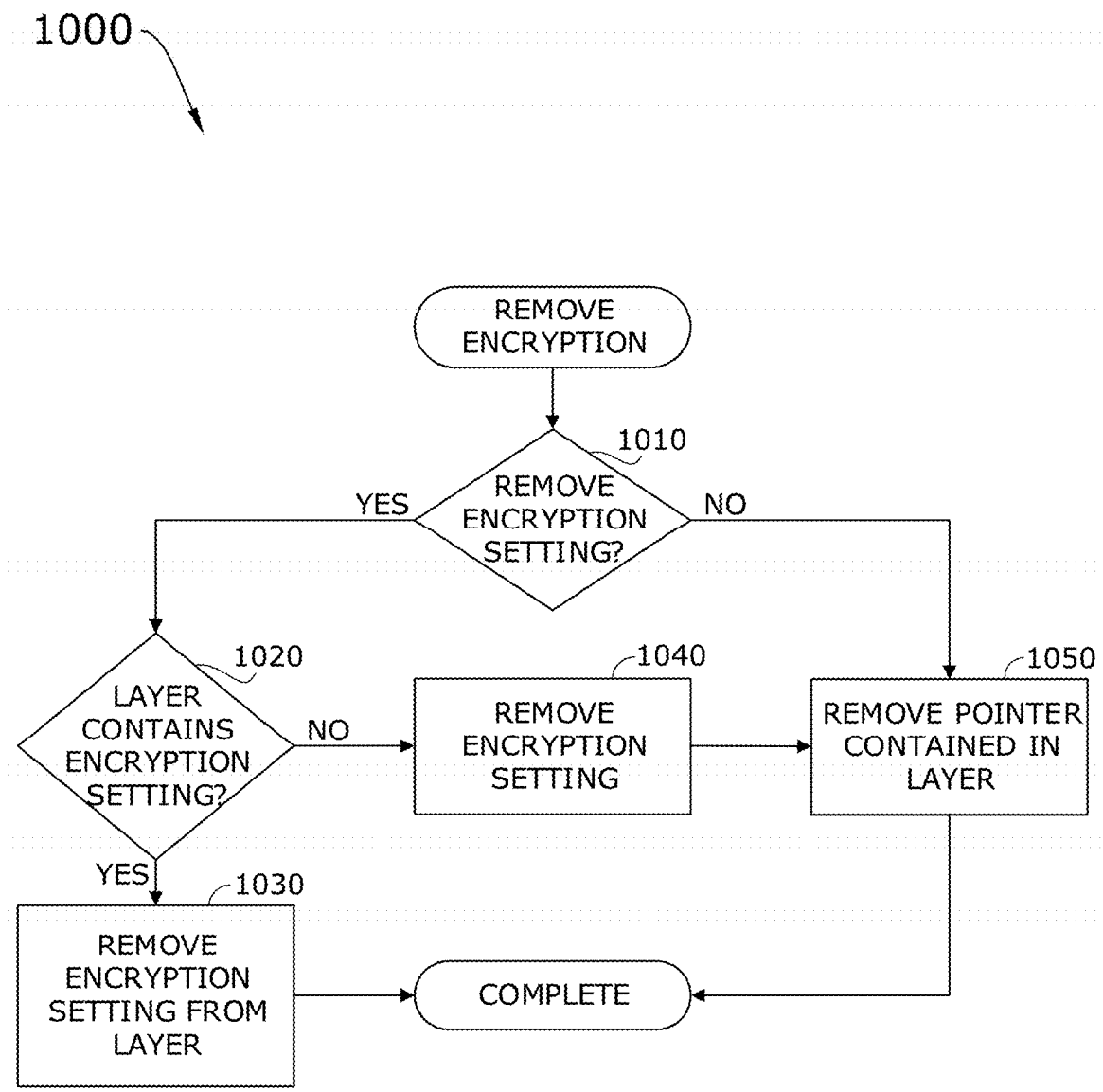
FIG. 10 conceptually illustrates a method for removing encryption in some embodiments.

Another encryption example is demonstrated by way of FIG. 10, which conceptually illustrates a method for removing encryption 1000. Removing encryption involves decisions which need to ferret out whether the user wishes to remove the password (the encryption setting as a whole) or just prevent a single layer from using a password, while other layers continue to leverage the password-based encryption of those layers. As shown in this figure, the method for removing encryption 1000 starts with a step for determining (at 1010) whether to remove the encryption setting as a whole or not. When the encryption setting is not determined (at 1010) to be intended for removal on the whole, then the method for removing encryption 1000 simply removes an encryption pointer contained in the layer (at 1050). That is, by removing the pointer in the layer, encryption is removed only for that layer, thereby ensuring that other layers maintain the password protection of the encryption. However, when the encryption setting is determined (at 1010) to be intended for removal, then the method for removing encryption 1000 determines (at 1020) whether the layer contains encryption settings or not. When the layer contains the encryption settings, the method for removing encryption 1000 removes the encryption settings from the layer (at 1030) and then ends. However, when the layer is determined (at 1020) not to contain the encryption settings, the method for removing encryption 1000 removes the encryption setting on the whole for all layers (at 1040) and then removes the encryption pointer contained in the layer itself (at 1050). Then the method for removing encryption 1000 ends.

Beyond encryption, the electronic spreadsheet data variation management and security system provides other approaches to protecting the contents of a capture area. For instance, one may choose to leverage the redaction and obfuscation capabilities of the electronic spreadsheet data variation management and security system to protect data viewing of private or secured data.

In some embodiments, redaction ensures that data in a redacted layer contains a predefined value that has no association to the data itself. That is, when a layer is redacted, any data held within any data layer for the same capture area is protected so that the actual data will not inadvertently be revealed to other users. In some embodiments, the predefined value is a specific error value of the associated spreadsheet program. In a preferred embodiment, the predefined value is the Excel™ #N/A error value. This predefined value (the "Excel™ #N/A error value") ensures that any downstream calculations that depend on the data within the capture area also show an error. The result of taking this approach ensures that data held within other layers within the capture area is not accidentally revealed to another user. Yet the integrity of the underlying data is maintained. When the user selects a data layer for the capture area, the downstream calculations will now update with legitimate results.

While this approach ensures the integrity of the underlying data, there are circumstances when a downstream calculation would need to retain its value, in a way that is viewable (i.e., not redacted), when the source data is hidden by the selection of the redacted layer. To compensate for this, the preferred embodiment enables downstream calculations to be excluded from the redaction operation. In some embodiments, the electronic spreadsheet data variation management and security system supports this by way of a "redaction reveal" capability. Operationally, the preferred embodiment provides this capability by creating a new capture area for the cell or plurality of cells that contain the downstream calculation(s), with one layer containing the formulas, and the second layer containing the absolute values for those formulas, when the redacted layer is selected. In some embodiments, the electronic spreadsheet data variation management and security system switches between these layers as the user switches between the redacted layer and the data layer for the target capture area.

By way of an example, consider a list of employees and their salaries. The salary information might need to be redacted (and encrypted), to allow the file to be shared without fear of revealing any confidential information. However, there may be a calculation included that displays the average salary of all employees, which may be intended to be visible by all users. This "redaction reveal" capability would allow the absolute value of the formula result to be substituted whenever the redacted layer is shown.

Aside from redaction, obfuscation is an alternative protection mechanism that uses the information from the last selected data layer to calculate the replacement values for each cell or plurality of cells to be held within the obfuscation layer. The preferred embodiment provides two approaches to obfuscation, masking and replacement.

Masking is a process in which each character is either replaced by a masking character or is left untouched according to a defined set of rules. Details of a method for translating a supplied cell value with a masked equivalent 1500 are described above, by reference to FIG. 15. Adding to those details is an example of masking in which a social security number 000-11-2222 might be replaced with . . . •••-••-2222 (per https://www.ssa.gov/employer/stateweb.htm the prefix '000' is not a valid social security number).

While masking is useful for the majority of protected classifications of data, there are situations in which a completely new value needs to be generated that has a one-to-one relationship with the source value. In such cases, the obfuscation substitution option can be leveraged. Some details of obfuscation substitution are described above in connection with the method for substituting a supplied cell value with a system generated alternative value 1400, and by reference to FIG. 14. In the preferred embodiment, the method for substituting a supplied cell value with a system generated alternative value 1400 uses a defined prefix, suffix, and a serial number format to create the unique replacement. In other embodiments, additional defined values are maintained in the lookup table (LUT). An example where this approach would be useful is in double blind drug trials, where the name of each original patient would be replaced by "PATIENT" followed by a serial number, the combination of which would be unique to a given patient. If the list of data contained the patients name multiple times, each occurrence would be replaced with the same "PATIENT"/serial number combination.

After having created any of these variations of data for each defined capture area, the user can then save the file to an electronic storage medium, or transmit the file electronically to another person or location. During the save operation, each capture area is inspected to see if the data held within each of its layers requires encryption, and if so performs the encryption option. This is described next, by reference to FIGS. 11 and 12. Specifically, FIG. 11 conceptually illustrates a method for embedding data of defined capture areas in the spreadsheet workbook to save or transmit 1100, and FIG. 12 conceptually illustrates a method for encrypting a layer 1200.

Figure 11:
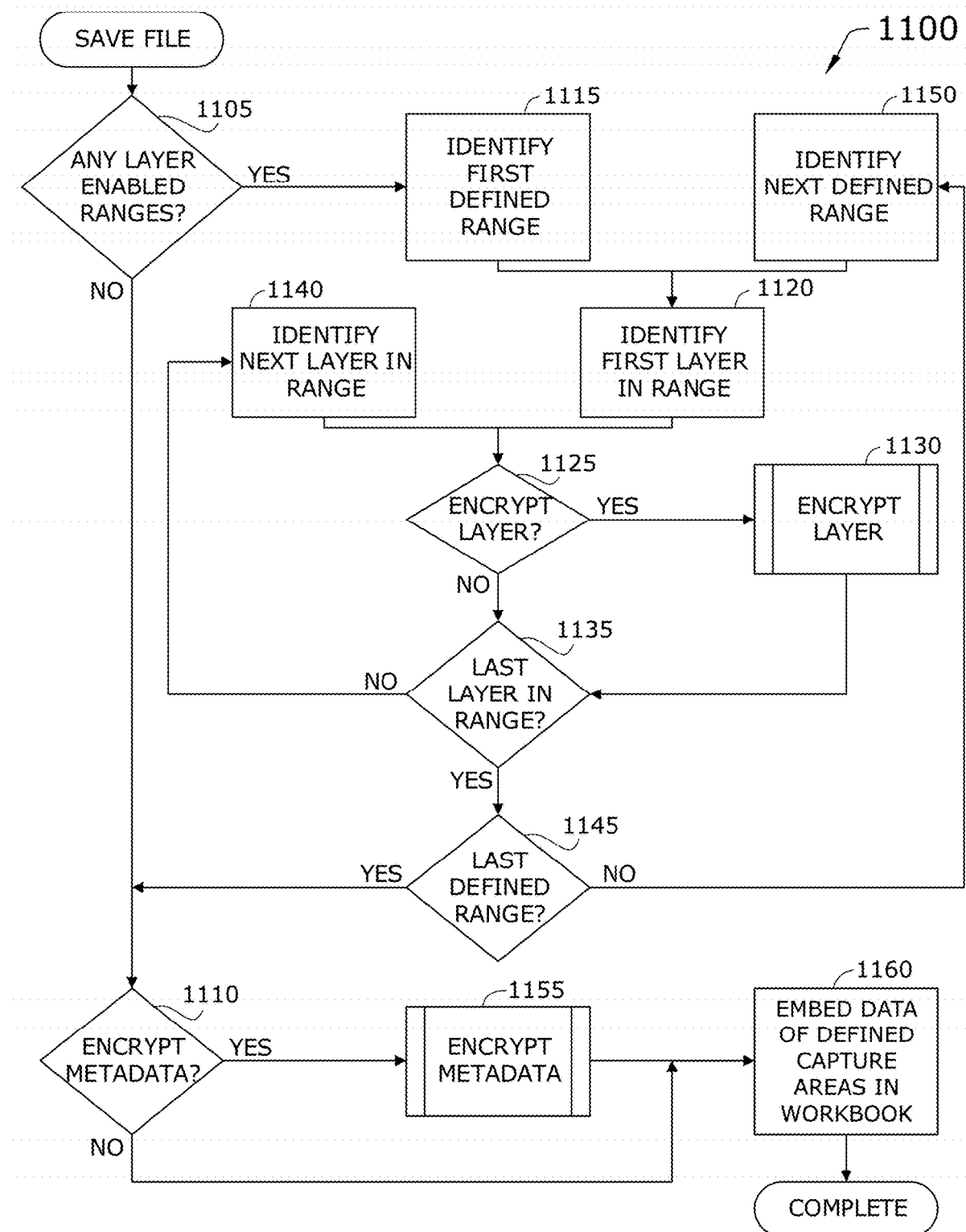
FIG. 11 conceptually illustrates a method for embedding data of defined capture areas in spreadsheet workbook to save or transmit in some embodiments.

Starting first with FIG. 11, the method for embedding data of defined capture areas in the spreadsheet workbook to save or transmit 1100 begins when the user chooses to save the workbook. When the save selection is made, the method for embedding data of defined capture areas in the spreadsheet workbook to save or transmit 1100 determines (at 1105) whether there are any layer enabled ranges—or the defined capture areas. When there are no layer enabled ranges, the method for embedding data of defined capture areas in the spreadsheet workbook to save or transmit 1100 proceeds to a step for determining (at 1110) whether to encrypt metadata or not. In some embodiments, metadata includes data that is independent of the layers, such as the lookup table (LUT) noted above in the case of making substitutions of data for anonymity purposes. For example, if a layer is redacted or obfuscated, encryption is not needed, while a normal data layer that is neither redacted nor obfuscated may need to be encrypted, and metadata may be encrypted regardless. Thus, when the metadata is to be encrypted, the method for embedding data of defined capture areas in the spreadsheet workbook to save or transmit 1100 performs a step for encrypting (at 1155) the metadata and moves on to the next step for embedding the data of the defined capture areas in the workbook (at 1160). Encrypting the metadata can be completed by, for example, the method for applying encryption to one or more layers 900 described above, by reference to FIG. 9. On the other hand, when the metadata is not determined (at 1110) to need encryption, then the method for embedding data of defined capture areas in the spreadsheet workbook to save or transmit 1100 transitions ahead to the step for embedding the data of the defined capture areas in the workbook (at 1160). Then the method for embedding data of defined capture areas in the spreadsheet workbook to save or transmit 1100 ends.

Turning back to the determination (at 1105), when there are layer enabled ranges, the method for embedding data of defined capture areas in the spreadsheet workbook to save or transmit 1100 identifies the first defined range (at 1115), followed by identifying the first layer in the range (at 1120). Next, the method for embedding data of defined capture areas in the spreadsheet workbook to save or transmit 1100 determines (at 1125) whether to encrypt the layer or not. When the layer is not to be encrypted, the method for embedding data of defined capture areas in the spreadsheet workbook to save or transmit 1100 transitions to a step for determining (at 1135) whether the present layer is the last layer in the range or not. However, when the present layer is determined (at 1125) to need encryption, the method for embedding data of defined capture areas in the spreadsheet workbook to save or transmit 1100 performs a step for encrypting (at 1130) the layer.

Figure 12:
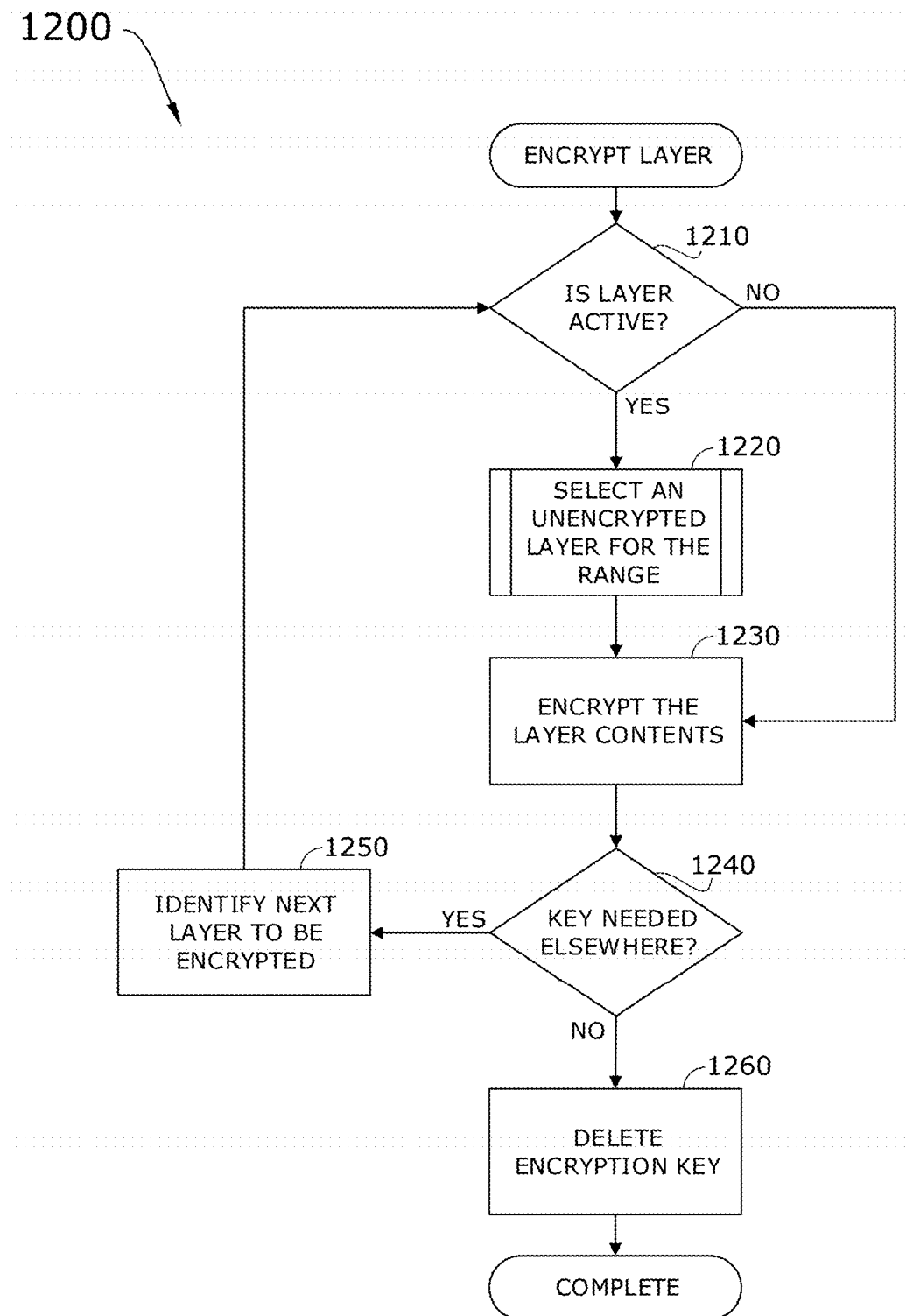
FIG. 12 conceptually illustrates a method for encrypting a layer in some embodiments.

Encrypting the layer can be completed by the method for encrypting a layer 1200, described here by reference to FIG. 12. Specifically, the method for encrypting a layer 1200 is performed at the step for encrypting the layer (at 1130), which is performed in the method for embedding data of defined capture areas in the spreadsheet workbook to save or transmit 1100. As shown in FIG. 12, the method for encrypting a layer 1200 starts by determining (at 1210) whether the layer to encrypt is the active (selected) layer or not. When the layer to encrypt is not the active layer, the method for encrypting a layer 1200 skips ahead to a step for encrypting (at 1230) the layer contents. On the other hand, when the layer to encrypt is determined (at 1210) to be the active (selected) layer, then the method for encrypting a layer 1200 proceeds to a step for selecting an unencrypted layer for the range (at 1220), followed by encrypting the layer contents (at 1230).

Next, the method for encrypting a layer 1200 of some embodiments determines (at 1240) whether the key for encryption is needed elsewhere, as in other layers to be encrypted. When the encryption key is needed elsewhere (e.g., one or more other layers), the method for encrypting a layer 1200 proceeds to a step for identifying the next layer to be encrypted (at 1250). When the next layer to be encrypted is identified, the method for encrypting a layer 1200 returns to the determination (at 1210) of whether the identified layer is the active (selected) layer or not, and proceeds according to the sequence of steps noted above. Turning back to the determination of whether the key is needed elsewhere (at 1240), when the encryption key is not needed elsewhere, the method for encrypting a layer 1200 moves forward to the next step of deleting the encryption key (at 1260). Then the method for encrypting a layer 1200 ends.

Turning back to FIG. 11, after encrypting the layer if determined (at 1125) to require encryption or after determining (at 1125) that the layer need not be encrypted, the method for embedding data of defined capture areas in the spreadsheet workbook to save or transmit 1100 proceeds to the next step of determining (at 1135) whether the present layer is the last layer in the range or not. In some embodiments, when the present layer is the last layer in the range, the method for embedding data of defined capture areas in the spreadsheet workbook to save or transmit 1100 moves forward to a step for determining (at 1145) whether the present range is the last defined range or not. On the other hand, when the present layer is not determined (at 1135) to be the last layer in the range, the method for embedding data of defined capture areas in the spreadsheet workbook to save or transmit 1100 transitions back to a step for identifying the next layer in the range (at 1140) and proceeds according to the steps noted above.

Now, when the present range is determined (at 1145) to be the last defined range, then the method for embedding data of defined capture areas in the spreadsheet workbook to save or transmit 1100 transitions to the step for determining (at 1110) whether to encrypt the metadata or not, and then proceeding through the subsequent steps as noted above. On the other hand, when the present range is not determined (at 1145) to be the last defined range, then the method for embedding data of defined capture areas in the spreadsheet workbook to save or transmit 1100 transitions back to a step for identifying the next defined range (at 1150), followed by identifying the first layer in the range (at 1120), and continuing through the steps as described above.

In a preferred embodiment, leaving an encrypted version of the data displayed within the capture area might be confusing to another user of the workbook. To compensate for this, the preferred embodiment ensures that at least one layer is unencrypted, and is selected when the file is saved. Also, redacted and obfuscated layers are not encrypted, since the data they contain does not reveal anything that would be considered highly confidential. In the absence of a redacted or obfuscated layer, the user would need to ensure that one of the data layers contains information that would not be considered confidential, which could conceivably be a blank layer.

Once all appropriate layers have been encrypted, any additional information (metadata) is also encrypted as may be appropriate, and is then embedded into the workbook file, before the file is saved to an electronic storage medium.

In some embodiments, opening a workbook retrieves the embedded information saved with the workbook and recreates each of the capture areas and layers within those capture areas in much the same way as the user would have done originally.

In some embodiments, when selecting a layer that has been encrypted (such as by following the method for selecting and copying the layer contents to a defined range that the layer applies to in an electronic spreadsheet 400, described above by reference to FIG. 4), the encryption key needed to decrypt the data is obtained and the layer is then decrypted before its contents are copied to the capture area of the worksheet. In some embodiments, when the encryption key is a password, the user will be prompted to provide this information. In some embodiments, the electronic spreadsheet data variation management and security system allows for the encryption key to be extracted from a secure location electronically, making the selection of an encrypted layer seamless to an authorized user.

In situations where multiple capture areas are defined, and multiple layers within those capture areas have been created, it may be somewhat cumbersome for a user to switch between layers for each capture area to present a particular scenario of their data model. To accommodate this, the electronic spreadsheet data variation management and security system of some embodiments allows for the creation of a group, whereby the user can select one or more of the defined capture areas to include in the group. Furthermore, the electronic spreadsheet data variation management and security system of some embodiments allows the user to define which layer is to be selected for each one of the capture areas included in the group. Once defined, the electronic spreadsheet data variation management and security system of some embodiments allows for the selection of the group, which automatically changes to the defined layer for each of the capture areas included within the group. This is demonstrated below in connection with FIG. 13, which illustrates a method for selecting a combination of layers managed as a group. This approach allows for rapid and easily accessible scenario models to be selected, which can operate on a single worksheet or a plurality of worksheets contained within the workbook.

Figure 13:
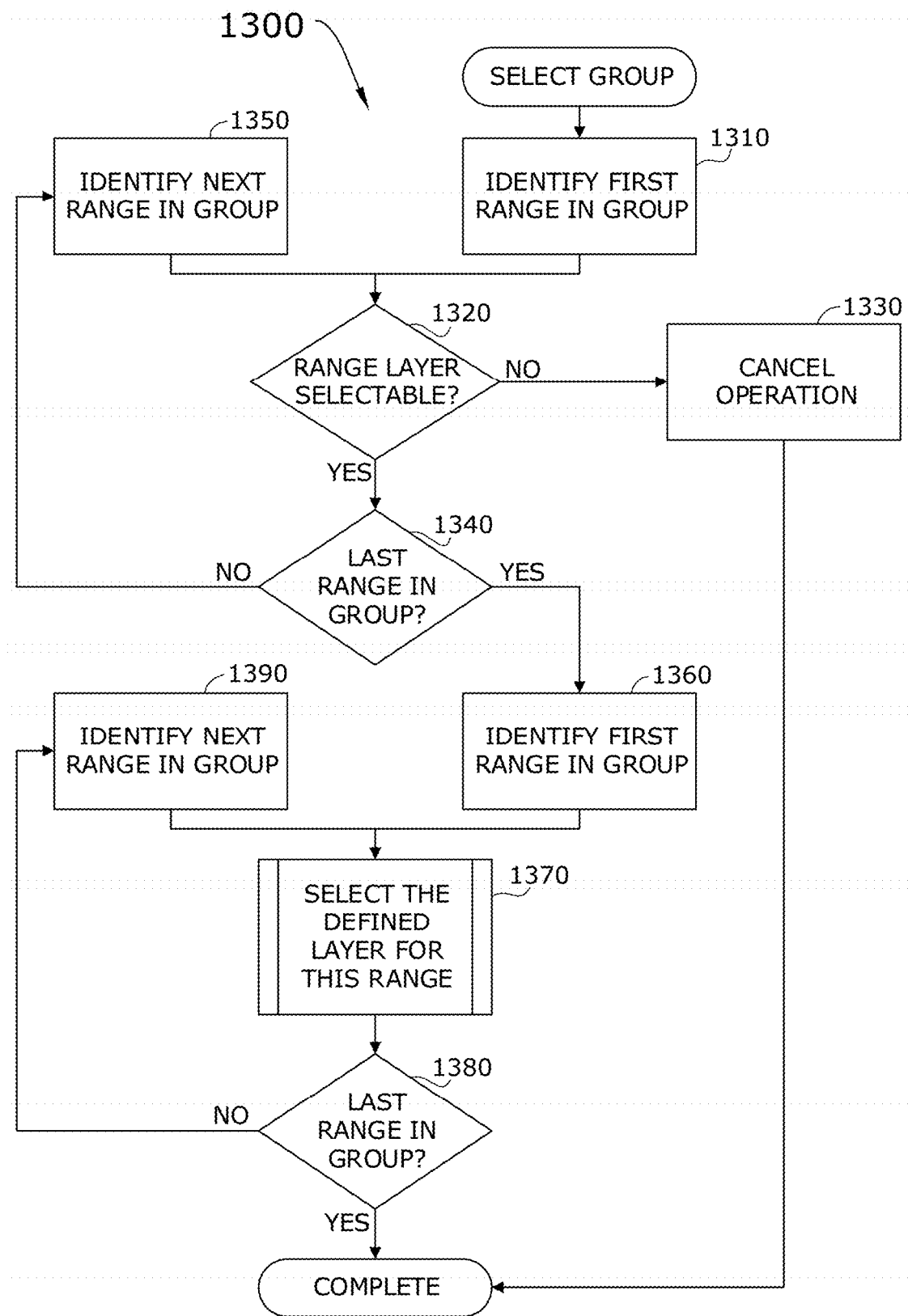
FIG. 13 conceptually illustrates a method for selecting a combination of layers managed as a group in some embodiments.

By way of example, FIG. 13 conceptually illustrates a method for selecting a combination of layers managed as a group 1300. In some embodiments, the method for selecting a combination of layers managed as a group 1300 starts by identifying a first range in a group (at 1310). Then the method for selecting a combination of layers managed as a group 1300 determines (at 1320) whether the range layer is selectable or not. When the range layer is not selectable, the method for selecting a combination of layers managed as a group 1300 proceeds to the next step of canceling the operation (at 1330) and then ending. However, when the range layer is selectable, the method for selecting a combination of layers managed as a group 1300 moves ahead to a step for determining (at 1340) whether the range is the last range in the group or not. When the range is not the last range in the group, the method for selecting a combination of layers managed as a group 1300 performs a step for identifying the next range in the group (at 1350) and proceeds according to the sequence of steps following identification of the first range in the group (at 1310), as described above. However, when the range is determined (at 1340) to be the last range in the group, then the method for selecting a combination of layers managed as a group 1300 moves on to a step for identifying (or rather, re-identifying) the first range in the group (at 1360), followed by a step for selecting the defined layer for the present range (at 1370). The present range is the first range during an initial cycle, but is updated to each successive range when cycling through the next ranges for the method for selecting a combination of layers managed as a group 1300. Thus, after selecting the defined layer for the present range, the method for selecting a combination of layers managed as a group 1300 determines (at 1380) whether the present range is the last range in the group. When the present range is not the last range in the group, the method for selecting a combination of layers managed as a group 1300 transitions to a step for identifying the next range in the group (at 1390), and then proceeds through the sequence of steps noted above. On the other hand, when the present range is determined (at 1380) to be the last range in the group, then the method for selecting a combination of layers managed as a group 1300 ends.

Independent of the layering capability, a "Layer Manager" interface and module, supported by the electronic spreadsheet data variation management and security system in the preferred embodiment, monitors all changes to a cell or a plurality of cells within the workbook. The information entered is then evaluated against a number of extensible, pre-defined rules to determine if the data being entered may constitute that of a protected class of data. Many data protection laws and regulations exist, and continue to be expanded on, so having a system that can monitor and act on the identification of such protected data classifications will assist users in maintaining compliance with legal, regulatory, and business requirements. If the identified data matches a defined rule (e.g., if a social security number were to be entered), then the electronic spreadsheet data variation management and security system of some embodiments alerts the user to this fact, and assists the user in protecting the information, which could be through the obfuscation masking capability previously described.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 16 conceptually illustrates an electronic system 1600 with which some embodiments of the invention are implemented. The electronic system 1600 may be a computer, mobile device, tablet, phone, PDA, or any other sort of electronic device. Such an electronic system includes various types of computer readable media and interfaces for various other types of computer readable media. Electronic system 1600 includes a bus 1605, processing unit(s) 1610, a system memory 1615, a read-only 1620, a permanent storage device 1625, input devices 1630, output devices 1635, and a network 1640.

The bus 1605 collectively represents all system, peripheral, and chipset buses that communicatively connect the numerous internal devices of the electronic system 1600. For instance, the bus 1605 communicatively connects the processing unit(s) 1610 with the read-only 1620, the system memory 1615, and the permanent storage device 1625.

From these various memory units, the processing unit(s) 1610 retrieves instructions to execute and data to process in order to execute the processes of the invention. The processing unit(s) may be a single processor or a multi-core processor in different embodiments.

The read-only-memory (ROM) 1620 stores static data and instructions that are needed by the processing unit(s) 1610 and other modules of the electronic system. The permanent storage device 1625, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1625.

Other embodiments use a removable storage device (such as a floppy disk or a flash drive) as the permanent storage device 1625. Like the permanent storage device 1625, the system memory 1615 is a read-and-write memory device. However, unlike storage device 1625, the system memory 1615 is a volatile read-and-write memory, such as a random access memory. The system memory 1615 stores some of the instructions and data that the processor needs at runtime. In some embodiments, the invention's processes are stored in the system memory 1615, the permanent storage device 1625, and/or the read-only 1620. For example, the various memory units include instructions for processing appearance alterations of displayable characters in accordance with some embodiments. From these various memory units, the processing unit(s) 1610 retrieves instructions to execute and data to process in order to execute the processes of some embodiments.

The bus 1605 also connects to the input and output devices 1630 and 1635. The input devices enable the user to communicate information and select commands to the electronic system. The input devices 1630 include alphanumeric keyboards and pointing devices (also called "cursor control devices"). The output devices 1635 display images generated by the electronic system 1600. The output devices 1635 include printers and display devices, such as cathode ray tubes (CRT) or liquid crystal displays (LCD). Some embodiments include devices such as a touchscreen that functions as both input and output devices.

Finally, as shown in FIG. 16, bus 1605 also couples electronic system 1600 to a network 1640 through a network adapter (not shown). In this manner, the computer can be a part of a network of computers (such as a local area network ("LAN"), a wide area network ("WAN"), or an intranet), or a network of networks (such as the Internet). Any or all components of electronic system 1600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the drawings conceptually illustrate runtime processes or methods, each with multiple steps. In each case, the specific operations of a process may not be performed in the exact order shown and described. Specific operations may not be performed in one continuous series of operations, and different specific operations may be performed in different embodiments. Furthermore, each process could be implemented using several sub-processes, or as part of a larger macro process. Additionally, the concept of providing variations of data, and securing such variations of data, as provided through the electronic spreadsheet data variation management and security system and methods for the management and security of data variations in an electronic spreadsheet of the present disclosure, can be adapted for use and applied to any technology that has a need to store information. This is especially true for data modeling and business intelligence solutions, but could be applied to any field where data is stored in a structured or unstructured format. Thus, one of ordinary skill in the art would understand that the invention is not to be limited by the foregoing illustrative details, but rather is to be defined by the appended claims.

I claim:

1. A method for managing and securing data variations in an electronic spreadsheet workbook comprising:

identifying, in a worksheet of an electronic spreadsheet workbook, a capture area comprising one or more cells;

collecting metadata about the capture area;

collecting authentic and comprehensible data content present within the capture area;

creating a first layer of the capture area with the collected authentic and comprehensible data content;

creating a second layer of the capture area based on the metadata;

selecting a desired layer comprising one of the first layer and the second layer;

setting, in a spreadsheet program running on a computing device of a user, an active layer of the electronic spreadsheet workbook to the desired layer of the worksheet, wherein the active layer is displayed in a user interface of the spreadsheet program, wherein the spreadsheet program provides a plurality of spreadsheet interface tools comprising a first spreadsheet interface tool that enables the user to selectively change the active layer to any layer of the capture area and a second spreadsheet interface tool comprising a redaction tool that enables the user to obscure the authentic and comprehensible data content;

receiving a selection of the redaction tool to redact the authentic and comprehensible data content present within the capture area; and creating a layer of the capture area, wherein each value of the redacted data content present with the capture area is replaced with an unrelated value that renders the authentic and comprehensible data content symbolic and incomprehensible data content when visually output for display and viewing by users.

2. The method for managing and securing data variations in an electronic spreadsheet of claim 1, wherein the worksheet includes a first formula within a first outer cell that is outside of the capture area, wherein the first formula references redacted data content within the capture area to perform a first calculation, wherein the plurality of spreadsheet interface tools further comprises a descendant calculation setting tool, wherein the method further comprises:

receiving a selection of the descendant calculation setting tool by a particular user and identifying descendant calculations that reference at least one cell within the capture area; and receiving a first descendant setting by the particular user interacting with the descendant calculation setting tool in connection with the first formula within the first outer cell, wherein the first descendant setting maintains an authentic and comprehensible display setting for the first calculation.

3. The method for managing and securing data variations in an electronic spreadsheet of claim 2, wherein the worksheet includes a second formula within a second outer cell that is outside of the capture area, wherein the second formula references redacted data content within the capture area to perform a second calculation, wherein the method further comprises receiving a second descendant setting by the particular user interacting with the descendant calculation setting tool in connection with the second formula within the second outer cell, wherein the second descendant setting substitutes an absolute value for a result of the second calculation, wherein the absolute value is different from the result of second calculation, wherein the spreadsheet program automatically reverts to an authentic and comprehensible display setting for the result of the second calculation when redaction of the data content within the capture area is removed.

4. A method for managing and securing data variations in an electronic spreadsheet workbook comprising:

identifying, in a worksheet of an electronic spreadsheet workbook, a capture area comprising one or more cells;

collecting metadata about the capture area;

collecting authentic and comprehensible data content present within the capture area;

creating a first layer of the capture area with the collected authentic and comprehensible data content;

creating a second layer of the capture area based on the metadata;

selecting a desired layer comprising one of the first layer and the second layer;

setting, in a spreadsheet program running on a computing device of a user, an active layer of the electronic spreadsheet workbook to the desired layer of the worksheet, wherein the active layer is displayed in a user interface of the spreadsheet program, wherein the spreadsheet program provides a plurality of spreadsheet interface tools comprising a first spreadsheet interface tool that enables the user to selectively change the active layer to any layer of the capture area and a second spreadsheet interface tool comprising an obfuscation tool that enables the user to obscure the authentic and comprehensible data content;

receiving a selection of the obfuscation tool to obfuscate the authentic and comprehensible data content present within the capture area;

creating a layer containing a copy of the authentic and comprehensible data content within the capture area; and replacing one or more values of the authentic and comprehensible data content present within the capture area of the created layer with a context sensitive alternative value that renders the copied authentic and comprehensible data content partially comprehensible data content when visually output for display and viewing by users.

5. A method for managing and securing data variations in an electronic spreadsheet workbook comprising:

identifying, in a worksheet of an electronic spreadsheet workbook, a capture area comprising one or more cells;

collecting metadata about the capture area;

collecting authentic and comprehensible data content present within the capture area;

creating a first layer of the capture area with the collected authentic and comprehensible data content;

creating a second layer of the capture area based on the metadata;

selecting a desired layer comprising one of the first layer and the second layer;

setting, in a spreadsheet program running on a computing device of a user, an active layer of the electronic spreadsheet workbook to the desired layer of the worksheet, wherein the active layer is displayed in a user interface of the spreadsheet program, wherein the spreadsheet program provides a plurality of spreadsheet interface tools comprising a first spreadsheet interface tool that enables the user to selectively change the active layer to any layer of the capture area and a second spreadsheet interface tool comprising an obfuscation tool that maintains a substitution lookup table (LUT) to substitute one or more values of the authentic and comprehensible data content with alternative values in the substitution LUT;

receiving a selection of the obfuscation tool to obfuscate the authentic and comprehensible data content present within the capture area;

creating a layer containing a copy of the authentic and comprehensible data content within the capture area;

substituting one or more values of the authentic and comprehensible data content present within the capture area of the created layer with a corresponding value from the LUT;

generating additional entries in the LUT when required; and rendering the copied authentic and comprehensible data content unidentifiable when visually output for display and viewing by users.

* * * * *